United States Patent
Bynum et al.

(10) Patent No.: US 11,330,472 B2
(45) Date of Patent: May 10, 2022

(54) SYSTEMS AND METHODS FOR DYNAMIC PSEUDO-COOPERATIVE LOAD BALANCING BY INDEPENDENT NODES BASED ON DIFFERENTIATED ATTRIBUTES AND VOLUME

(71) Applicant: Verizon Patent and Licensing Inc., Basking Ridge, NJ (US)

(72) Inventors: Christopher D. Bynum, Denver, CO (US); Joshua J. Hollander, Littleton, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 95 days.

(21) Appl. No.: 16/994,846

(22) Filed: Aug. 17, 2020

(65) Prior Publication Data
US 2022/0053374 A1 Feb. 17, 2022

(51) Int. Cl.
| | |
|---|---|
| *H04W 56/00* | (2009.01) |
| *H04W 28/08* | (2009.01) |
| *H04W 24/08* | (2009.01) |
| *H04L 9/06* | (2006.01) |
| *H04W 12/0431* | (2021.01) |

(52) U.S. Cl.
CPC ....... *H04W 28/0958* (2020.05); *H04L 9/0643* (2013.01); *H04W 12/0431* (2021.01); *H04W 24/08* (2013.01); *H04L 2209/80* (2013.01)

(58) Field of Classification Search
CPC ......... H04W 28/0958; H04W 12/0431; H04W 24/08; H04L 9/0643; H04L 2209/80
See application file for complete search history.

(56) References Cited

U.S. PATENT DOCUMENTS

| | | | |
|---|---|---|---|
| 2014/0153393 A1* | 6/2014 | Janakiraman | H04L 67/1036 370/235 |
| 2017/0026345 A1* | 1/2017 | Salek | H04L 9/0872 |

OTHER PUBLICATIONS

V. Mirrokni, "Consistent Hashing with Bounded Loads," Google AI Blog, Apr. 3, 2017 (available at https://ai.googleblog.com/2017/04/consistent-hashing-with-bounded-loads.html, visited Aug. 7, 2020).

* cited by examiner

*Primary Examiner* — Sai Ming Chan

(57) ABSTRACT

Embodiments described herein provide for the pseudo-cooperative load balancing and/or distribution of traffic and/or other types of data by independent nodes. Techniques described herein may be considered "pseudo-cooperative" in that the resulting distribution of traffic and/or other data may resemble load balancing techniques in which various nodes, that serve as an ingress for data for distribution and/or other types of processing, communicate with each other (e.g., share context information) in order to perform load balancing in a coordinated or cooperative manner. In contrast, nodes in accordance with some embodiments described herein may perform load balancing with the same or similar results (e.g., a relatively even distribution of traffic and/or other data), without communicating with each other, thus saving time, processing resources, and/or other resources.

20 Claims, 14 Drawing Sheets

US 11,330,472 B2

SYSTEMS AND METHODS FOR DYNAMIC PSEUDO-COOPERATIVE LOAD BALANCING BY INDEPENDENT NODES BASED ON DIFFERENTIATED ATTRIBUTES AND VOLUME

BACKGROUND

Wireless networks and/or other systems may handle (e.g., send, receive, process, and/or perform other operations on) traffic (e.g., user traffic associated with one or more User Equipment ("UEs"), such as mobile telephones) or other types of data (e.g., usage data). Various systems, or containerized instances of systems, may be involved in such sending, receiving, processing, etc. In some situations, the amount of traffic or data for one system (or one instance of a system) to handle may be disproportionately greater than the amount of traffic for another system. In such situations, one system may take a relatively long time to process traffic while other systems are idle.

DETAILED DESCRIPTION OF THE PREFERRED EMBODIMENTS

The following detailed description refers to the accompanying drawings. The same reference numbers in different drawings may identify the same or similar elements.

Embodiments described herein provide for the pseudo-cooperative load balancing and/or distribution of traffic and/or other types of data by independent nodes. Techniques described herein may be considered "pseudo-cooperative" in that the resulting distribution of traffic and/or other data may resemble load balancing techniques in which various nodes, that serve as an ingress for data for distribution and/or other types of processing, communicate with each other (e.g., share context information) in order to perform load balancing in a coordinated or cooperative manner. In contrast, nodes in accordance with some embodiments described herein may perform load balancing with the same or similar results (e.g., a relatively even distribution of traffic and/or other data), without communicating with each other, thus saving time, processing resources, and/or other resources.

Concepts described herein may apply to any system that includes "independent" nodes, or nodes acting "independently" in the context of determining how an overall system that includes multiple nodes should distribute traffic, data, and/or other types of load. That is, in embodiments described herein, an independent node may make determinations with respect to load balancing, distribution, and/or other objectives that improve the overall efficiency of the system without identifying or receiving information regarding load balancing, distribution, etc. associated with other nodes of the system.

In some embodiments, "node" may refer to any suitable element of a system that includes multiple nodes. Some examples discussed herein are described in the context of "containers." For example, a container may be, may include, and/or may implement, one or more virtual machines, one or more of applications, one or more processes, or the like. An example of a containerized system includes a Software-Defined Network ("SDN"), which may include elements of RAN of a wireless network (e.g., a Fifth Generation ("5G") RAN, a Long-Term Evolution ("LTE") RAN, and/or some other type of RAN), elements of a core of a wireless network (e.g., a 5G core ("5GC"), an Evolved Packet Core ("EPC"), and/or some other type of core). In some scenarios, containers of the wireless network may be referred to as Containerized Network Functions ("CNFs"), Virtualized Network Functions ("VNFs"), or some other suitable nomenclature. In the context of such a containerized system, a "node" may be referred herein to as a "container" in the following examples. Containerized systems may be managed by management facilities that support node lifecycle operations such as orchestration, deployment and scaling (for example, the open-source Kubernetes system).

Figure 1:
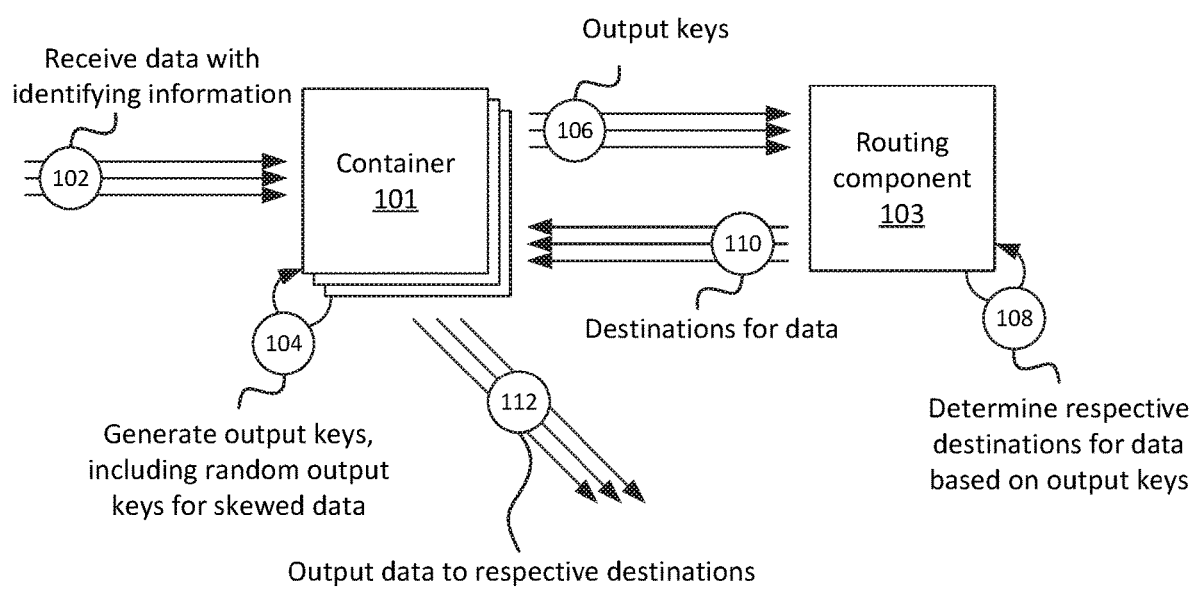
FIG. 1 illustrates an example overview of one or more embodiments described herein, in which independent containers may perform a pseudo-cooperative load balancing technique in accordance with some embodiments.

In FIG. 1, for example, a set of containers 101 may receive (at 102) data with identifying information. For example, in some embodiments, the received data may include user plane traffic associated with a wireless network, where the "identifying information" includes a User Equipment ("UE") with which the traffic is associated (e.g., the identifying information for a particular UE may include a Mobile Directory Number ("MDN") associated with the particular UE, an International Mobile Station Equipment Identity ("IMEI") value associated with the particular UE, a Subscription Permanent Identifier ("SUPI") associated with the particular UE, and/or some other suitable identifier). As another example, the received data may include metadata or records associated with a plurality of users, devices, or other types of entities. For example, the metadata or records may indicate activities performed by the users, devices, etc., such as a web browsing history, a content viewing history, and/or other types of information.

As noted above, in accordance with some embodiments, each one of the containers 101 may receive a particular set of traffic, data, etc. that is independent of the traffic, data, etc. received by other containers 101. As discussed below, each container 101 may generate (at 104) a set of output keys for the data. The output keys may, in some embodiments, be based on the identifiers of the data. In some embodiments, the output keys may be generated using a hashing function and/or some other suitable function. For example, data with a first identifier may be associated with a first output key (e.g., generated using a first hashing function on the identifier and/or other portion of the data), while data with a second identifier may be associated with a second output key (e.g., generated using a second hashing function on the identifier and/or other portion of the data). In some embodiments, the function used to generate output keys may be the same function, which may result in different output keys when given different identifiers. In other words, two different output keys may be generated for two different data items with two different identifiers by applying the same hashing function to the two different identifiers. In some embodiments, the function (or functions) used to generate the output keys may include a "default" function. The "default" function may be the same across containers 101. For example, two different containers 101 may generate the same output key on two different data items that are both associated with the same identifier.

In accordance with some embodiments, containers 101 may further use different functions, and/or may modify an input of the "default" function, based on a disproportionately large, or "skewed," amount of data associated with a given identifier (e.g., relative to data associated with different identifiers). For example, as discussed below, if a given container 101 receives significantly more data associated with one identifier (or multiple different identifiers) than data associated with a different identifier of out of a set of candidate identifiers, container 101 may use a different function than the "default" function and/or may modify the input of the "default" function for the skewed data, such that the output keys associated with the skewed data are different from simply generating the output keys using the "default" function on the identifier of the skewed data.

Containers 101 may further output (at 106) the output keys to routing component 103. For example, in some embodiments, routing component 103 may be, may include, and/or may be implemented by an orchestration component or routing component of a containerized system. Generally, routing component 103 may maintain a set of interfaces (e.g., may implement one or more application programming interfaces ("APIs")) or other suitable communication pathways between routing component 103 and containers 101. For example, routing component 103 may maintain host names, Internet Protocol ("IP") addresses, and/or other identifiers or addresses via which routing component 103 may communicate with containers 101. In some embodiments, containers 101 may be capable of communicating with each other via one or more APIs or other suitable communication pathways, which may be the same or different APIs or communication pathways via which containers 101 communicate with routing component 103.

Routing component 103 may, based on the output keys, determine (at 108) respective destinations for the data. For example, routing component 103 may maintain a mapping between output keys and destinations. In some embodiments, routing component 103 may perform one or more calculations or functions on the output keys to determine destinations based on the output keys. For example, if three example destinations are available and a received output key includes a value of "4," routing component 103 may perform a modulo function or other suitable function to derive a value between "1" and "3" based on the output key (e.g., where a value of "1" would indicate the first candidate destination, a value of "2" would indicate the second candidate destination, and a value of "3" would indicate the third candidate destination), and/or may otherwise determine which of the three destinations the output key is associated with. In this manner, even if the individual containers 101 are unaware of the presence or quantity of other containers 101, each individual container may contribute to the overall balancing of traffic and/or other data among destinations. For example, by way of generating the output keys in a differentiated and randomized manner (e.g., based on whether certain data is skewed), each individual container 101 may contribute to the overall load balancing of the system that includes multiple independent containers 101. In this manner, the load balancing (e.g., generation of output keys in accordance with some embodiments) performed by the set of containers 101 may be "pseudo-cooperative," in the sense that the resulting load balancing may resemble a load balancing scheme in which each container 101 is aware of amounts of traffic associated with the other containers 101 of the system.

Routing component 103 may further output (at 110) the identified destinations to containers 101, from which the output keys were received (at 106). For example, routing component 103 may provide the host names, IP addresses, and/or other identifiers to containers 101 associated with the identified (at 108) destinations. In some embodiments, the destinations may be one or more other devices or systems with which containers 101 are configured to communicate. In some embodiments, the destinations may be containers 101 themselves (e.g., a particular container 101 that receives data may also be a container to which the data should be provided for processing, and/or a different container 101 may be a container to which the data should be provided for processing). Containers 101 may accordingly output (at 112) the data to the respective destinations, as indicated by routing component 103. As noted above, the outputted data may be spread across destinations, without containers 101 having any awareness of the quantity of available destinations and/or of the amount of data outputted by other containers 101, thus resulting in a "pseudo-cooperative" load balancing technique of some embodiments.

Figure 2:
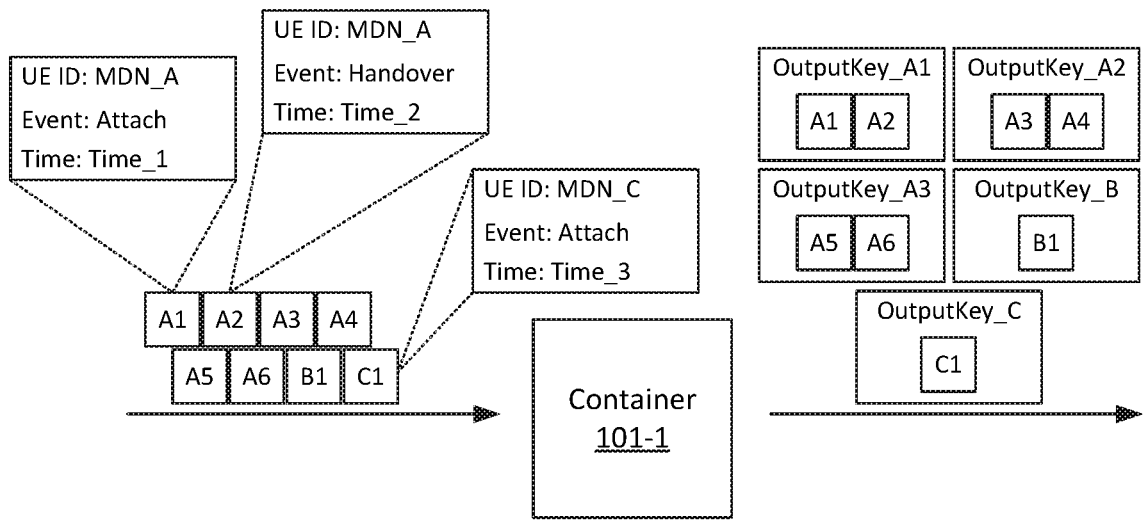
FIG. 2 illustrates an example of output key generation by independent nodes based on volume of differentiated data received by the independent nodes, in accordance with some embodiments.
Figure 2:
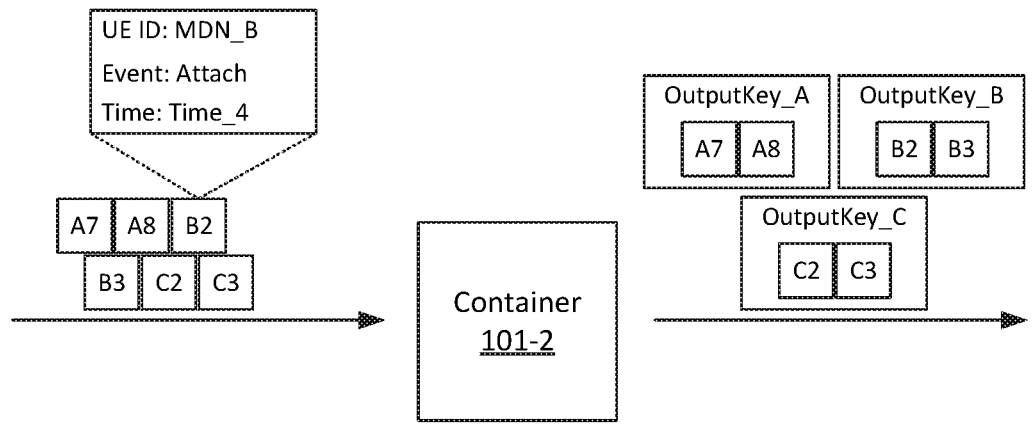
Figure 2:
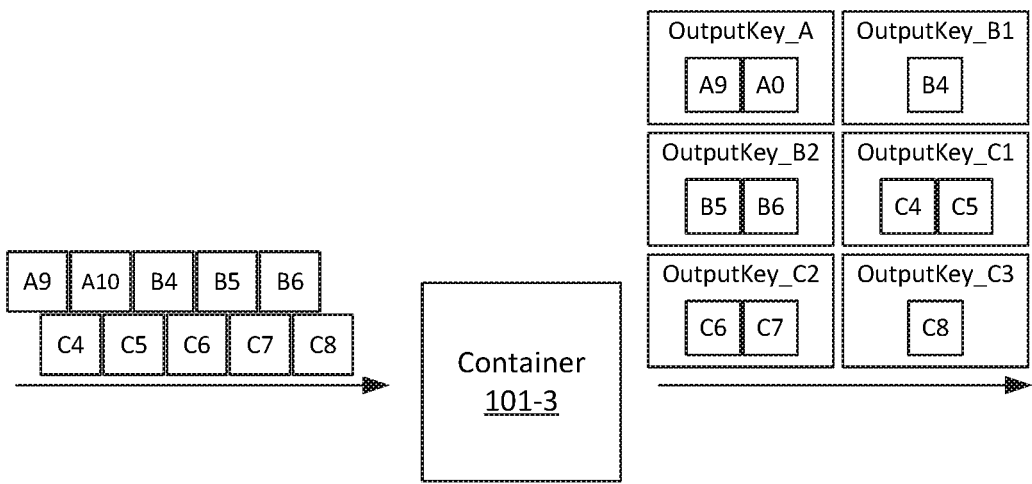

FIG. 2 illustrates an example of output key generation by independent nodes (e.g., containers 101) based on volume of differentiated data received by the independent nodes, in accordance with some embodiments. As shown, for example, containers 101-1, 101-2, and 101-3 may each receive different sets of data over a particular period of time. The data in this example includes discrete data "items," (e.g., records, packets, frames, and/or other delineations or representations of data). For example, each data item in this figure may indicate an event associated with a particular UE. Events may include, for example, the attachment of a UE to a RAN, a handover of a UE from one RAN to another RAN, an establishment of one or more bearers between a UE and a RAN and/or a core of a wireless network, and/or other suitable events. In other situations, different types of data may be received, and/or traffic to and/or from a given UE may be received.

As shown, for example, container 101-1 may receive eight example data items: A1-A6, B1, and C1. The notation used herein for data items indicates an index for a differentiating identifier (e.g., "A," "B," or "C") followed by an index number. Thus, "A1" indicates a first item associated with the identifier index "A," "A2" indicates a second item associated with the identifier index "A," and so on. Further, "B1" indicates a first item associated with the identifier index "B," "C1" indicates a first item associated with the identifier index "C," and so on. In this example, the identifier indices refer to different UEs, which may each be associated with their own network-level identifiers (e.g., MDNs, IMEI values, SUPI values, IP addresses, or the like).

Thus, the item "A1" may be associated with an "Attach" event associated with a UE having the example MDN "MDN_A," which occurred at example time "Time_1." Further, the item "A2" may be associated with a "Handover" event associated with the UE having the example MDN "MDN_A," which occurred at example time "Time_2." Further still, the item "C1" may be associated with an "Attach" event associated with a UE having the example MDN "MDN_C," which occurred at example time "Time_3." In some embodiments, container 101-1 may be, may include, or may be implemented by a charging system of a wireless network (e.g., an Offline Charging System ("OFCS") associated with the wireless network, an Online Charging System ("OCS"), etc.), a Session Management Function ("SMF") associated with the wireless network, and/or one or more other elements of a given wireless network. For example, the received example data items may be records to write to one or more databases or other data stores. In other examples, the received example data items may include data to be processed in other ways, such as to perform one or more calculations on, perform routing or queuing on, and/or other types of processing.

As shown here, the "A" data items received by container 101-1 may be skewed (e.g., a disproportionate quantity) in relation to the "B" and "C" data items. That is, container 101-1 has received 6 "A" data items (i.e., A1-A6) while receiving 1 "B" and "C" data item each (i.e., B1 and C1). In some embodiments, the determination of whether data for a particular identifier is skewed may be based on a threshold proportion or percentage. For example, if the percentage of "A" data items is greater than 50%, then container 101-1 may determine that the "A" data items are skewed and/or disproportionate.

In some embodiments, the determination of whether data for a particular identifier is skewed may be based on a measure of disparity between data items for different identifiers. For example, if the percentage of "A" data items is at least twice the percentage of one or more other data items, container 101-1 may determine that the "A" data items are skewed and/or disproportionate. Here, for example, the percentage of received "A" data items (i.e., 75%) is more than twice the percentage of received "B" data items (i.e., 12.5%), and is more than twice the percentage of received "C" data items (i.e., 12.5%). Further, the percentage of received "A" data items (i.e., 75%) is more than twice the percentage of cumulative "B" and "C" data items (i.e., 25%). Based on some or all of these (and/or different) factors, container 101-1 may determine that the "A" data items (e.g., the data items relating to the UE having the MDN "MDN_A") are skewed in relation to one or both of the other data items.

As such, when generating output keys for data items A1-A6, container 101-1 may generate the output keys in a manner that is different from generating output keys for data items B1 and C1. For example, container 101-1 may use one or more "default" functions to generate the output keys for data items B1 and C1, while using modified functions (and/or functions with modified inputs) to generate the output keys for data items A1-A6. For example, container 101-1 may use a "default" function to generate the output key "OutputKey_B" for data item B1, and may use the same function (and/or a different "default" function that is associated with the identifier "MDN_C") to generate the output key "OutputKey_C" for data item C1. For example, in order to generate the output keys "OutputKey_B" and "OutputKey_C," container 101-1 may provide, as input to the "default" function(s), the identifiers "MDN_B" and "MDN_C," respectively.

As further shown, container 101 may generate multiple different output keys for the "A" data items. For example, container 101 may split the "A" data items into multiple groups, and may use different functions than a "default" function to generate the output keys for each group. In this example, container 101-1 may split the "A" data items into three groups as follows: a first group including data items A1 and A2, a second group including data items A3 and A4, and a third group including data items A5 and A6. In practice, container 101-1 may split the data items into additional or fewer groups.

In some embodiments, the quantity of groups may be based on a measure of disparity between the quantity of "A" data items to "B" and/or "C" data items. For example, if there are significantly more "A" data items than "B" and/or "C" data items, container 101-1 may split the "A" data items into a relatively large quantity of groups. On the other hand, if there are more "A" data items than "B" and/or "C" data items (but the difference is relatively less than in the previous example), then container 101-1 may split the "A" data items into relatively fewer groups. In this manner, the groups (and resulting output keys) need not be tied to any particular arrangement or quantity of destinations over which the data is load balanced and ultimately processed.

In the example of FIG. 2, the first group of "A" data items (i.e., data items A1 and A2) may be generated by a first function, and/or by providing a modified version of the identifier associated with the data items (i.e., "MDN_A" in this example) to a "default" function or other function. For example, container 101-1 may generate the output key "OutputKey_A1" by providing the modified identifier "MDN_A1234" to a "default" function and/or one or more other suitable functions. For example, container 101-1 may modify the identifier associated with these data items by appending an alphanumeric string to the end of the identifier. In some embodiments, container 101-1 may modify the identifier in some other way. In some embodiments, the string (e.g., "1234" here) may be randomly generated, may be selected from a pool of strings, and/or may be generated in some other suitable manner.

Similarly, container 101-1 may generate the output key "OutputKey_A2" (e.g., associated with data items A3 and A4) by using one or more different functions than were used to generate the output key "OutputKey_A1," and/or by using different values in one or more of the same functions used to generate the output key "OutputKey_A1." For example, container 101-1 may use the same functions to generate the output key "OutputKey_A1," but may modify the identifier differently (e.g., by providing the modified identifier "MDN_A5678," where "5678" may be randomly generated, selected from a pool, etc.). In a similar manner, container 101-1 may generate the output key "OutputKey_A3" (e.g., associated with data items A5 and A6) by using one or more different functions than were used to generate the output keys "OutputKey_A1" and/or "OutputKey_A2," and/or by using different (e.g., randomized) values in one or more of the same functions used to generate the output keys "OutputKey_A1" and/or "OutputKey_A2."

Thus, for the received data associated with three different identifiers (e.g., "MDN_A," "MDN_B," and "MDN_C"), container 101-1 may generate five different output keys. As similarly noted above, and as described below, the data itself may be outputted, forwarded, routed, etc. to one or more different destinations based on the output keys.

As further shown in FIG. 2, container 101-2 may receive six example data items: A7, A8, B2, B3, C2, and C3. In this example, none of the data items are "skewed," as container 101-2 has received an equal quantity of data items for each identifier (e.g., for each of the identifiers "MDN_A," "MDN_B," and "MDN_C"). Thus, container 101-2 may utilize one or more "default" functions to generate output keys for each one of the received data items. As shown, for example, the output keys "OutputKey_A," "OutputKey_B," and "OutputKey_C" may be respectively associated with the appropriate data items. As further shown, the output keys for the "B" and "C" data items (i.e., "OutputKey_B" and "OutputKey_C"), generated by container 101-2, may be the same as the output keys generated by container 101-1. Accordingly, as discussed below, data received by different containers 101-1 and 101-2, associated with the same output keys, may ultimately be routed to the same destination.

As further shown in FIG. 2, container 101-3 may receive ten data items: A9, A10, B4-B6, and C4-C8. In this example, container 101-3 may determine that the "B" and "C" data items are skewed with respect to one or more other data items. For example, the "B" data items may be skewed in relation to the "A" data items (e.g., 150% as many "B" data items as "A" data items). Container 101-3 may further determine that the "B" data items are not skewed in relation to the "C" data items (e.g., more "C" data items have been received than "B" data items). Further, container 101-3 may determine that the "C" data items are relatively more skewed than the "B" data items (e.g., 167% as many "C" data items as "B" data items, and/or 250% as many "C" data items as "A" data items). Accordingly, container 101-3 may split the "B" and "C" data items into multiple groups when generating output keys. Further, as the "C" data items are more skewed than the "B" data items, the quantity of groups for the "C" data items may be greater than the quantity of groups for the "B" data items.

For example, as shown, container 101-3 may group the "B" data items into two groups, where a first group includes data item B4 and a second group includes data items B5 and B6, thus resulting in output keys "OutputKey_B1" and "OutputKey_B2" (e.g., which may be generated in a manner similarly described above). Further, container 101-3 may group the "C" data items into three groups, where a first group includes data items C4 and C5, a second group includes data items C6 and C7, and a third group includes data item C8, thus resulting in output keys "OutputKey_C1," "OutputKey_C2," and "OutputKey_C3." Since the "A" data items are not skewed in relation to the other data items, container 101-3 may use a "default" set of functions to generate the output key "OutputKey_A" for data items A9 and A10, which may be the same output key as generated by container 101-2 for data items A7 and A8 (e.g., using the same set of functions).

In some embodiments, containers 101-1, 101-2, and 101-3 may output the generated output keys to routing component 103 and/or one or more other suitable devices or systems. In some embodiments, the output keys may be provided with an indication of a quantity of data items associated with each key (e.g., an indication that output key "OutputKey_A1" from container 101-1 is associated with two data items, an indication that output key "OutputKey_A" from container 101-2 is associated with two data items, an indication that output key "OutputKey_A" from container 101-3 is associated with two data items, an indication that output key "OutputKey_B1" from container 101-3 is associated with one data item, and so on). In some embodiments, containers 101-1, 101-2, and 101-3 may output the generated output keys without outputting the underlying data. In other words, the output keys may indicate that data was received (e.g., in a particular amount or quantity), but may not include the data itself. In some embodiments, containers 101-1, 101-2, and 101-3 may output the generated output keys on a periodic, intermittent, and/or some other basis. In some embodiments, containers 101-1, 101-2, and 101-3 may "push" the generated output keys (e.g., output without a specific request for each key or set of keys) and/or may provide the generated output keys in response to one or more requests for output keys.

Figure 3:
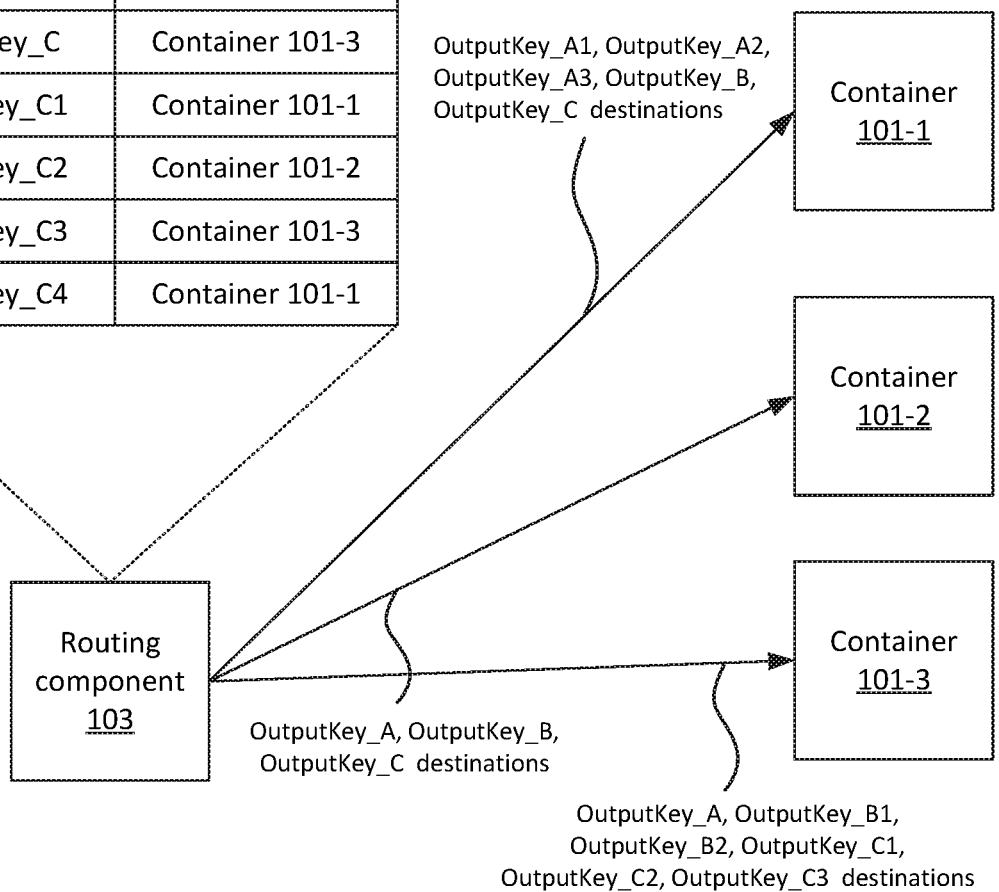
FIG. 3 illustrates an example determination of destinations for different data, received by a set of independent nodes, based on output keys generated by the independent nodes.

FIG. 3 illustrates an example determination of destinations for different data, received by a set of independent nodes (e.g., containers 101-1, 101-2, and 101-3), based on output keys generated by the independent nodes. For example, routing component 103 may receive the output keys from one or more containers 101 (e.g., containers 101-1, 101-2, and 101-3) and/or other types of nodes, and may determine one or more destinations for the data associated with the output keys. In some embodiments, routing component 103 may generate, receive, maintain, etc. data structure 300, which may indicate which destinations are associated with which output keys. In some embodiments, routing component 103 may not store, maintain, etc. data structure 300. In such embodiments, data structure 300 conceptually illustrates determinations of destinations for particular output keys based on one or more computations, functions, calculations, mappings, or the like performed by routing component 103.

In some embodiments. data structure 300 may be received from another device or system, and/or may be manually configured (e.g., by an operator). In some embodiments, data structure 300 may be generated by routing component 103, and/or may reflect computations, calculations, etc. performed by routing component 103. In some embodiments, routing component 103 may determine the existence of a set of candidate destinations for data. In this example, containers 101-1, 101-2, and 101-3 are candidate destinations for the data (e.g., as discussed with respect to FIG. 2). For example, containers 101 (e.g., containers 101-1, 101-2, and 101-3) may have been registered with or configured by routing component 103 (e.g., during a provisioning, instantiation, configuration, and/or reconfiguration process).

In some embodiments, routing component 103 may update the candidate destinations based on monitoring a status and/or availability of the candidate destinations. For example, containers 101 may periodically, intermittently, etc. provide status and/or availability information to routing component 103, such that routing component 103 is kept up-to-date as to an amount of available resources associated with each of containers 101, whether a given container 101 is operational, load information (e.g., an amount of resources currently being consumed, allocated, and/or which are otherwise unavailable) associated with each of containers 101, or the like. In some embodiments, routing component 103 may modify data structure 300 based on such load and/or status information. For example, if routing component 103 determines that container 101-2 is overloaded (e.g., is associated with greater a threshold measure of load), then routing component 103 may reduce the quantity of output keys associated with container 101-2. In some embodiments, routing component 103 may modify data structure 300 (e.g., the determinations or mappings of particular destinations to particular output keys) in one or more other ways, and/or based on other triggers associated with status and/or load information.

In some embodiments, routing component 103 may determine or adjust data structure 300 based on the quantity or amount of data associated with a given destination. For example, if routing component 103 receives a relatively large quantity of output keys that are associated with container 101-3 (and/or an indication of a relatively large quantity of data items associated with such output keys), routing component 103 may remap some of the output keys associated with container 101-3 to one or more other containers 101, such that the quantity of data associated with container 101-3 is reduced. Routing component 103 may utilize machine learning and/or one or more other suitable techniques to continually determine or adjust data structure 300, such that the amount of data associated with respective destinations is balanced or relatively balanced.

As discussed above, routing component 103 may provide identifiers associated with the destinations to the respective containers 101 from which the output keys were received. For example, based on the information in example data structure 300, routing component 103 may output the respective destinations associated with the respective output keys provided by containers 101 (e.g., in the example described above with respect to FIG. 2). For example, routing component 103 may provide host names of the destinations, IP addresses, and/or other identifiers or addresses via which the destinations can be reached, accessed, or otherwise communicated with.

Figure 4:
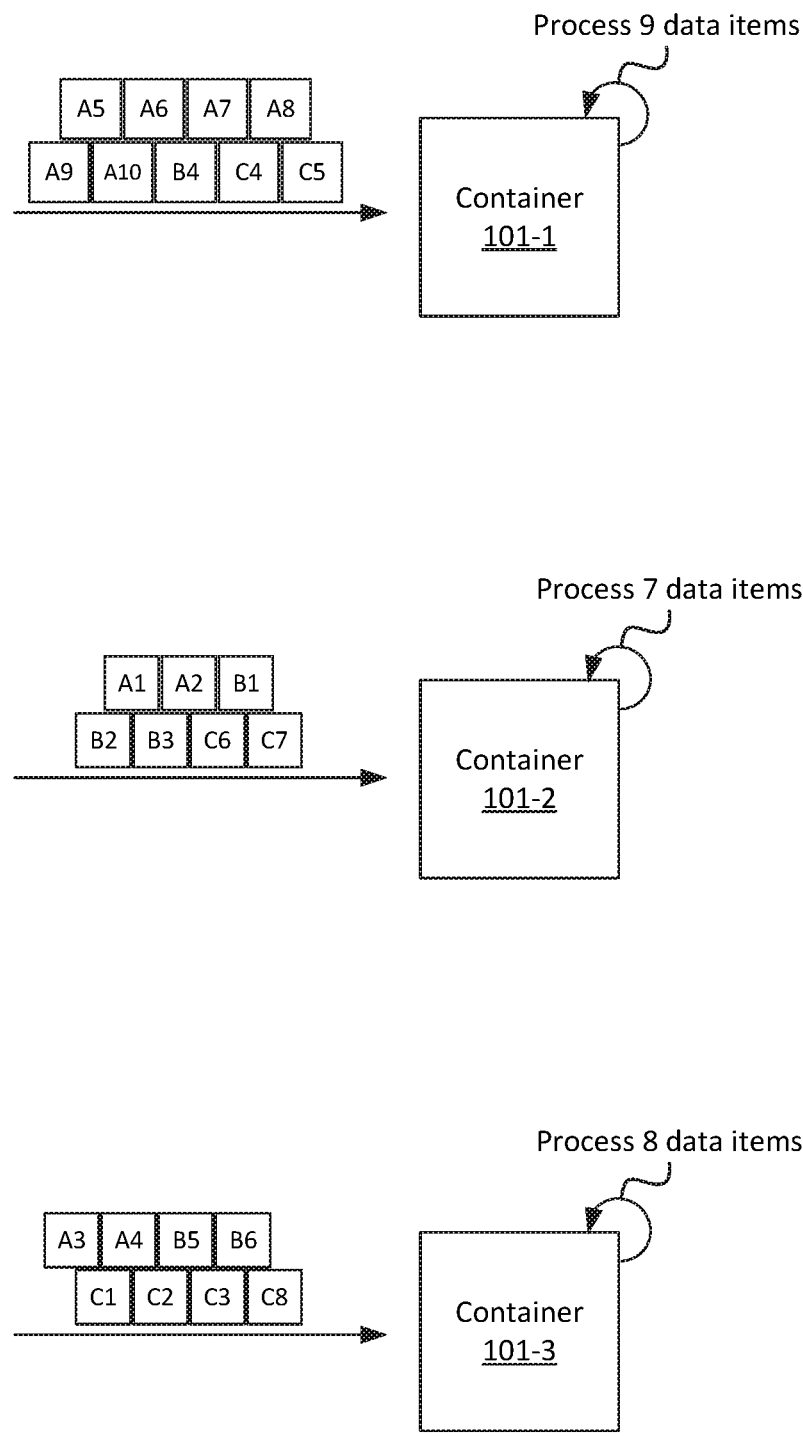
FIG. 4 illustrates an example pseudo-cooperative distribution of data by independent nodes based on output keys generated by the independent nodes, in accordance with some embodiments.

FIG. 4 illustrates an example of a pseudo-cooperative distribution of data (e.g., the data items discussed above with respect to FIGS. 2 and 3) based on the example output keys generated by containers 101-1, 101-2, and 101-3. As mentioned above, in these examples, containers 101-1, 101-2, and 101-3 serve as both ingress for the data items and as processors, handlers, or the like for the data items once the data items are distributed (e.g., based on the output keys discussed above). In practice, one set of devices, systems, containers, etc. may serve as ingress for traffic, data, etc. while a different set of devices, systems, or containers serve as destinations (e.g., processors, handlers, etc.) for the traffic or data.

As shown, based on the routing, mapping, and/or other types of determinations of respective destinations (e.g., based on data structure 300 discussed above), container 101-1 may receive data items A5-A10, B4, C4, and C5 for processing. In some embodiments, "processing" may include calculations on the data items, writing the data items to a database, queueing the data items, or other types of processing. Similarly, container 101-2 may receive (and process) data items A1, A2, B1-B3, C6, and C7, and container 101-3 may receive (and process) data items A3, A4, B5, B6, C1-C3, and C8. Thus, containers 101-1, 101-2, and 101-3 may receive nine, seven, and eight items for processing, respectively. As such, the processing of all of the items may be completed in approximately nine cycles, where a "cycle" refers to the amount of time and/or resources consumed by processing one data item.

Figure 5:
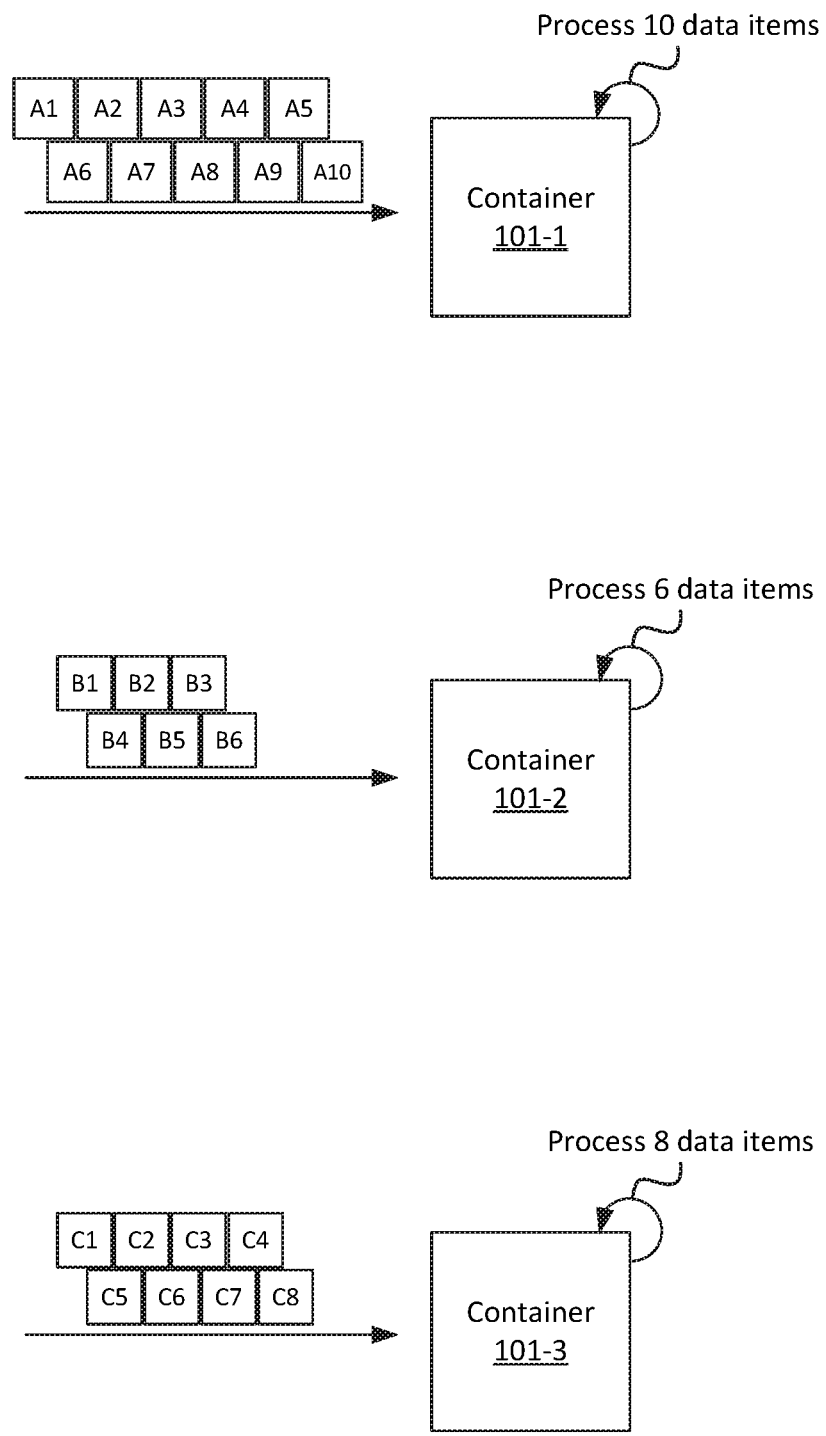
FIG. 5 illustrates an example distribution of data by independent nodes without performing the pseudo-cooperative techniques described with respect to FIGS. 1-4.

FIG. 5 illustrates an example distribution of data by independent nodes without performing the pseudo-cooperative techniques described with respect to FIGS. 1-4. In this example, container 101-1 may be designated for processing "A" data items (e.g., designated as a destination for "A" data items), container 101-2 may be designated for processing "B" data items, and container 101-3 may be designated for processing "C" data items. For example, routing component 103 may maintain a mapping, routing table, or other information indicating that "A" data items should be processed by container 101-1, and so on.

Thus, under this scheme, container 101-1 may receive data items A1-A10 for processing, container 101-2 may receive data items B1-B6 for processing, and container 101-3 may receive data items C1-C8 for processing. Thus, containers 101-1, 101-2, and 101-3 may receive ten, six, and eight items for processing, respectively. As such, the processing of all of the items may be completed in approximately ten cycles. However, during nearly half of the cycles, container 101-2 may be idle. That is, container 101-2 may complete the processing of data items B1-B6 in roughly the same amount of time as container 101-1 takes to process data items A1-A6. Container 101-2 may then be idle while container 101-1 processes data items A7-A10. Comparing the example pseudo-cooperative distribution techniques discussed above with respect to FIGS. 1-4 to the static distribution illustrated in FIG. 5, the pseudo-cooperative distribution techniques (e.g., using output keys that may be differentially created based on volume of particular data at individual containers 101) of some embodiments may result in increased efficiency (e.g., reduced idle time and/or increased utilization) as compared to a static distribution of data based on identifiers (e.g., "MDN_A," "MDN_B," or "MDN_C") alone.

Figure 6:
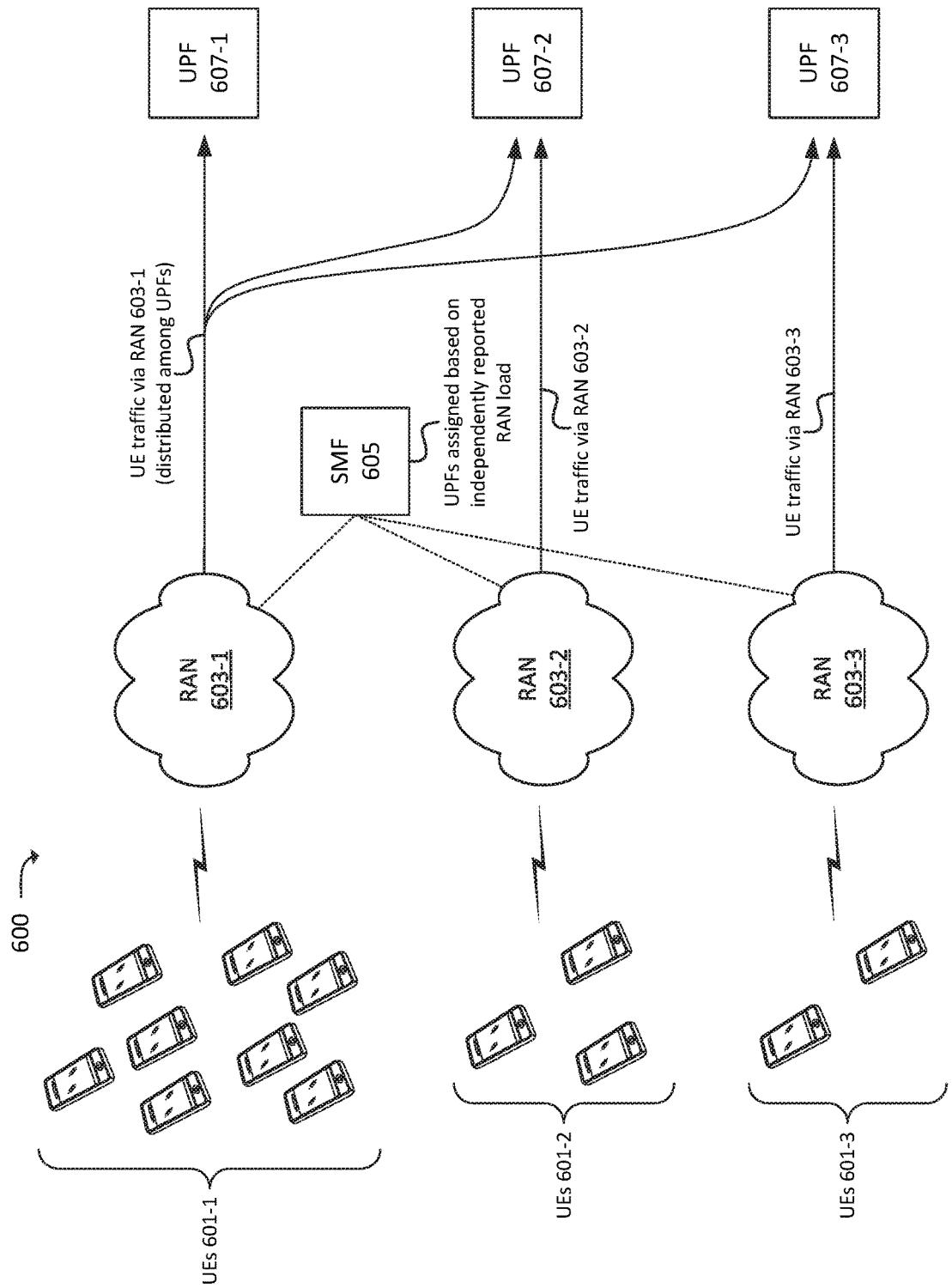
FIG. 6 illustrates an example pseudo-cooperative selection of elements of a core network to handle traffic from multiple different radio access networks ("RANs"), in accordance with some embodiments.

In some embodiments, concepts described above (e.g., with respect to FIGS. 1-4) may be applied in a wireless network environment, such as environment 600 shown in FIG. 6. For example, environment 600 may include one or more UEs 601 (e.g., mobile telephones, Internet of Things ("IoT") devices, and/or other types of devices with wireless connectivity) connected to one or more RANs 603. Further, when UEs 601 connect to RANs 603 and/or request a data connection (e.g., one or more logical bearers, protocol data unit ("PDU") sessions, or the like), RAN 603 may communicate with Session Management Function ("SMF") 605 to identify a particular User Plane Function ("UPF") 607 with which the data connection should be established.

In accordance with some embodiments, RAN 603 may provide one or more output keys to SMF 605 when indicating a request for a data connection associated with a particular UE 601. SMF 605 may accordingly select a particular UPF 607 based on the output keys. In practice, SMF 605 may use one or more other factors in addition to, or in lieu of, output keys when selecting a UPF 607 to handle a particular data connection with a particular UE 601. However, for the purposes of this example, UPF selection is described as being based on the output keys.

For example, RANs 603 may each generate output keys according to a "default" function when the quantity of connected UEs 601 and/or requested connections are below a threshold quantity. If, on the other hand, the quantity of connected UEs 601 and/or requested connections exceeds the threshold quantity, RAN 603 may use a modified function and/or modified values for the "default" function to generate output keys associated with the connection requests, as similarly discussed above. For example, as shown, RANs 603-2 and 603-3 may receive connection requests from, and/or be connected to, respective sets of UEs 601-2 and 601-3. In this example, assume that the quantities of UEs 601-2 and 601-3 are within a threshold quantity. As such, RANs 603-2 and 603-3 may provide output keys generated with a "default" function, based on which SMF 605 may determine that UPF 607-2 should be selected to handle traffic from UEs 601-2 connected to RAN 603-2, and that UPF 607-3 should be selected to handle traffic from UEs 601-3 connected to RAN 603-3.

On the other hand, RAN 603-1 may determine that a quantity of UEs 601-1 connected to RAN 603-1 and/or requesting connections via RAN 603-1 exceeds the threshold quantity, and may thus use one or more modified functions and/or values for the functions when generating output keys and may provide such output keys to SMF 605 when requesting identification of which UPF 607 should handle traffic associated with UEs 601-1.

Based on the output keys (e.g., as generated by 603-1), SMF 605 may identify different UPFs 607 to handle the traffic associated with UEs 601-1. For example, SMF 605 may identify that traffic for some of UEs 601-1 should be handled by UPF 607-1, that traffic for other ones of UEs 601-1 should be handled by UPF 607-2, and that traffic for yet other ones of UEs 601-1 should be handled by UPF 607-3.

Figure 7A:
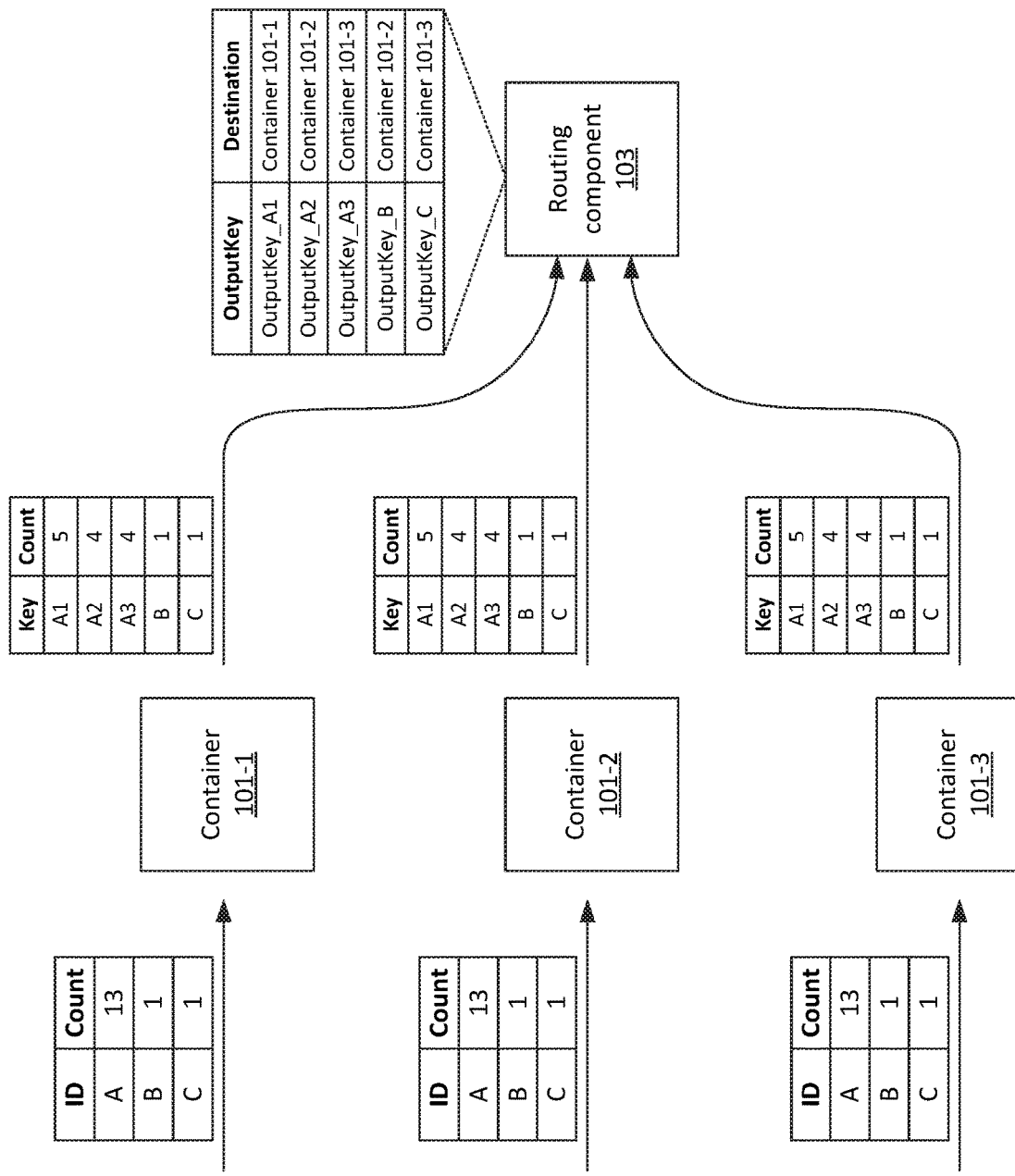
FIGS. 7A and 7B illustrate an example of pseudo-cooperative load balancing of data with a relatively even distribution of different data items across containers, in accordance with some embodiments.
Figure 7B:
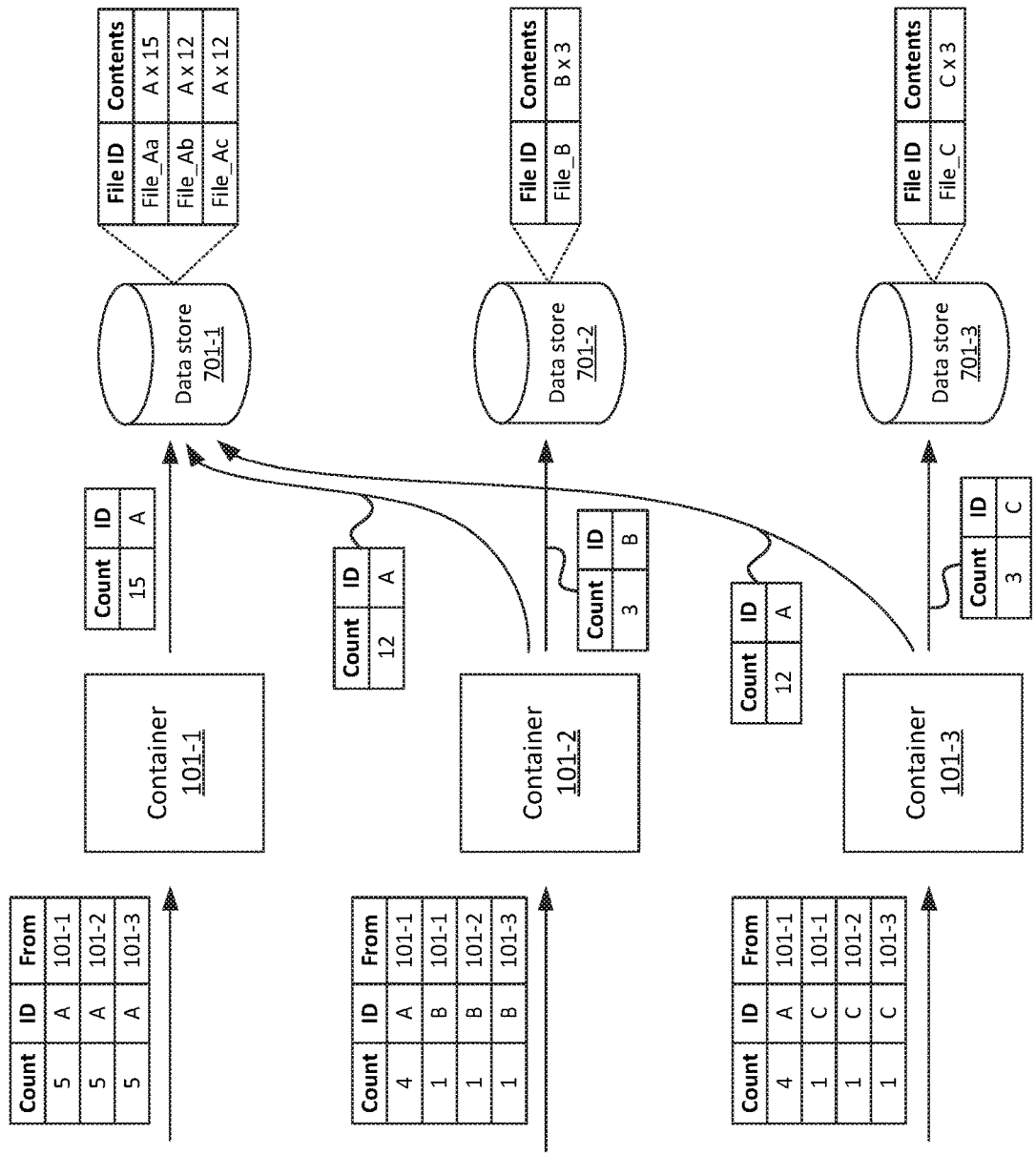

FIGS. 7A and 7B illustrate another example of pseudo-cooperative load balancing in accordance with some embodiments. In the example of FIGS. 7A and 7B, the data items may include data that may be more efficiently to process in a grouped or clustered manner, such as data to be written to one or more files. For example, in some situations, it may be advantageous for data having the same identifier (e.g., represented as "A," "B," and "C," in a manner similar to that discussed above) to be written to the same file, and/or to as few files as possible. Such grouped writing may save time and/or resources as compared to writing the data to multiple files. Further, the reading or other retrieval of the data may be more efficiently done from fewer files in some situations.

As shown in FIG. 7A, for example, containers 101-1, 101-2, and 101-3 may each receive a relatively similar or identical distribution of data items. In the example shown here, containers 101-1, 101-2, and 101-3 may each receive 13 "A" data items, one "B" data item, and one "C" data item. As similarly discussed above, each container 101 may thus determine that the "A" data items are "skewed," and may accordingly generate different output keys for the "A" data items, while generating one output key for the "B" and "C" data items. Thus, as shown, each container may generate and provide (e.g., to routing component 103) three output keys based on "A" data items (e.g., OutputKey_A1 (abbreviated in the figure as "A1"), OutputKey_A2, and OutputKey_A3), one output key based on "B" data items (e.g., OutputKey_B), and one output key based on "C" data items (e.g., OutputKey_C). As similarly discussed above, the output keys may also be provided to routing component 103 with an indication of the quantity of data items associated with each key (shown in the figure as "Count"). Routing component 103 may accordingly determine a destination for the data items according to each of the output keys. For example, as discussed above, routing component 103 may maintain a mapping, routing table, etc., and/or may dynamically determine destinations for the respective data items associated with each output key.

As shown in FIG. 7B, containers 101-1, 101-2, and 101-3 may receive the respective data items based on the mapping and/or other determination of destinations by routing component 103. For example, container 101-1 may receive fifteen "A" data items. Five "A" data items may be "received" from (e.g., retained by) container 101-1, five "A" data items may be received from container 101-2, and five "A" data items may be received from container 101-3.

As also shown in FIG. 7B, container 101-2 may receive four "A" data items, as well as three "B" data items. For example, one "B" data item may be "received" from (e.g., retained by) container 101-2, one "B" data item may be received from container 101-1, and one "B" data item may be received from container 101-3. Further, container 101-3 may receive four "A" data items, as well as three "C" data items. For example, one "C" data item may be "received" from (e.g., retained by) container 101-3, one "C" data item may be received from container 101-1, and one "C" data item may be received from container 101-2.

As such, all of the "B" and "C" data items may each be received by one container 101 for processing. This may be advantageous over situations in which the "B" and "C" data items are received by different containers 101 for processing. For example, as shown, a group of data stores 701 may each be associated with a particular category, identifier, etc. For example, data store 701-1 may be associated with "A" data items, data store 701-2 may be associated with "B" data items, and data store 701-3 may be associated with "C" data items. In some embodiments, data stores 701-1, 701-2, and 701-3 may each be implemented by a distinct device or system. In some embodiments, some or all of data stores 701-1, 701-2, and 701-3 may be implemented by the same device or system (e.g., a cloud computing system).

As shown, for example, containers 101-1, 101-2, and 101-3 may each write their respective "A" data items to one or more files stored by data store 701-1. For example, container 101-1 may write fifteen "A" data items to a first file ("File_Aa"), container 101-2 may write twelve "A" data items to a second file ("File_Ab"), and container 101-1 may write twelve "A" data items to a third file ("File_Ac"). Further, container 101-2 may write three "B" data items to a particular file in data store 701-2 ("File_B"), and container 101-3 may write three "C" data items to a particular file in data store 701-3 ("File_C"). As such, the writing of the "B" and "C" data items may result in fewer files than would be produced based on the writing based on identifiers alone.

Figure 7C:
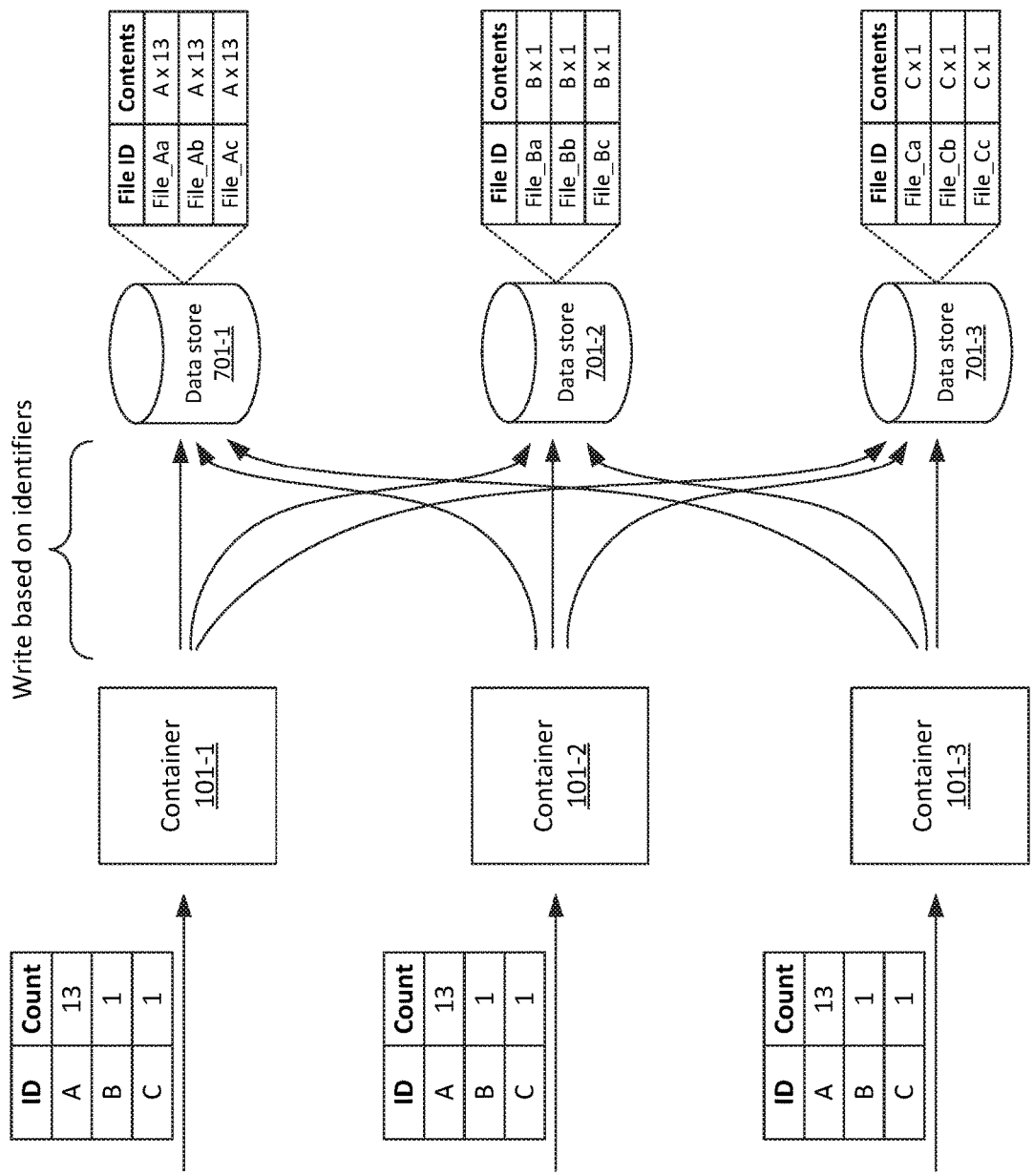
FIG. 7C illustrates an example distribution of data by independent nodes without performing the pseudo-cooperative techniques described with respect to FIGS. 7A and 7B.

For example, FIG. 7C illustrates an example writing of the same data items shown in FIG. 7A, but without the generation of, or pseudo-cooperative load balancing based on, the output keys of some embodiments. As shown, for example, each respective container 101 may write a file to the particular data store 701 associated with a respective identifier for received data items. For example, as shown, containers 101-1, 101-2, and 101-3 may each write a file containing thirteen "A" data items to data store 701-1 (e.g., "File_Aa," "File_Ab," and "File_Ac"), a file containing one "B" item to data store 701-2 (e.g., "File_Ba," "File_Bb," and "File_Bc"), and a file containing one "C" item to data store 701-3 (e.g., "File_Ca," "File_Cb," and "File_Cc"). As such, the writing based on identifiers (e.g., in the example of FIG. 7C) alone may result in the creation of, or writing to, more files than the writing based on output keys (e.g., in the examples of FIGS. 7A and 7B).

Figure 8:
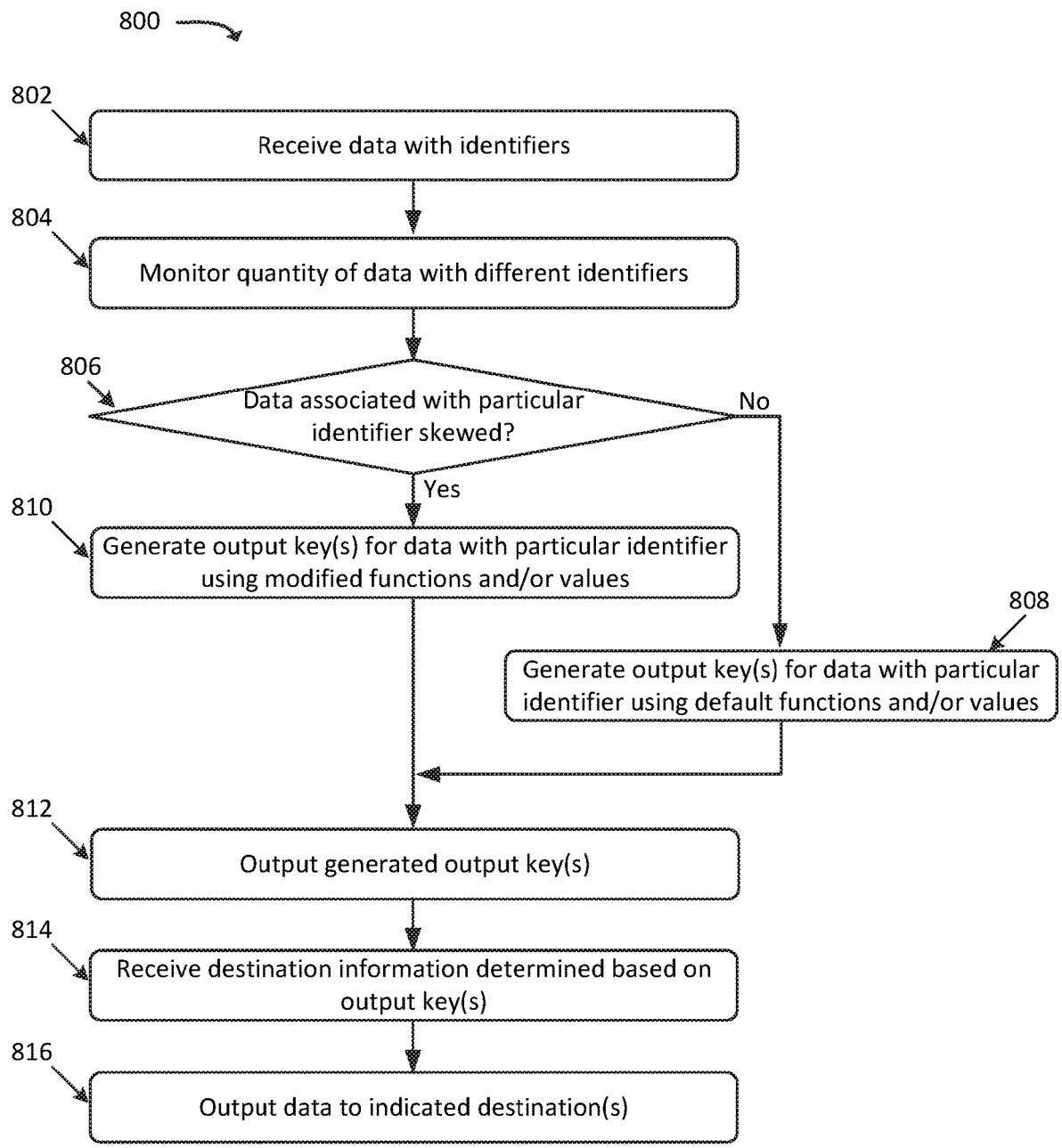
FIG. 8 illustrates an example process for performing a pseudo-cooperative load balancing technique by independent nodes, in accordance with some embodiments.

FIG. 8 illustrates an example process 800 for performing a pseudo-cooperative load balancing technique in accordance with some embodiments. In some embodiments, some or all of process 800 may be performed by container 101. In some embodiments, one or more other devices, or other types of devices or systems, may perform some or all of process 800 in concert with, and/or in lieu of, container 101.

As shown, process 800 may include receiving (at 802) data with identifiers. For example, as discussed above, the data may include traffic (e.g., user traffic) associated with one or more UEs, data records, and/or one or more other types of data. As further noted above, the data may include identifiers, which may include header information (e.g., a source IP address, a destination IP address, UE identifiers (e.g., IMEI, SUPI, etc.), or other identifiers).

Process 800 may further include monitoring (at 804) a quantity of data with different identifiers. For example, as discussed above, container 101 may monitor a quantity of data items on the basis of the identifiers associated with the data. Additionally, or alternatively, container 101 may monitor a quantity of overall data items received over time (e.g., independent of identifiers).

Process 800 may additionally include determining (at 806) whether data associated with a particular identifier is skewed. For example, as discussed above, container 101 may determine whether a quantity or amount of data, associated with a particular data item, is disproportionately large with respect to data associated with one or more other ones of the received data. Additionally, or alternatively, container 101 may determine whether a quantity or amount of overall data received is above a particular threshold (e.g., independent of identifiers). For example, with reference to FIG. 6 above, a particular RAN 603 may determine whether a quantity of connected UEs 601, or a quantity of UE connection requests, exceeds a threshold quantity. This threshold quantity may, in some embodiments, be adjusted or refined on an ongoing basis using machine learning and/or other suitable techniques.

For data that is not skewed (e.g., at 806—NO), then process 800 may also include generating (at 808) output keys for the data using a "default" function (e.g., based on the identifiers themselves). For data that is skewed (e.g., at 806—YES), then process 800 may include generating (at 810) output keys using modified functions and/or modified versions of the identifiers associated with the skewed data.

Process 800 may additionally include outputting (at 812) the generated output keys (e.g., generated at 808 and/or 810). For example, container 101 may output the generated output keys to routing component 103 and/or some other suitable device or system that determines destinations for the data based on the generated output keys. Additionally, or alternatively, container 101 may receive and/or maintain a mapping, routing table, or the like that indicates particular destinations for particular output keys.

Process 800 may also include receiving (at 814) destination information based on the output keys. For example, container 101 may receive such information from routing component 103, and/or may determine the destinations based on information maintained by container 101. Process 800 may further include outputting (at 816) the data to the indicated respective destinations.

Figure 9:
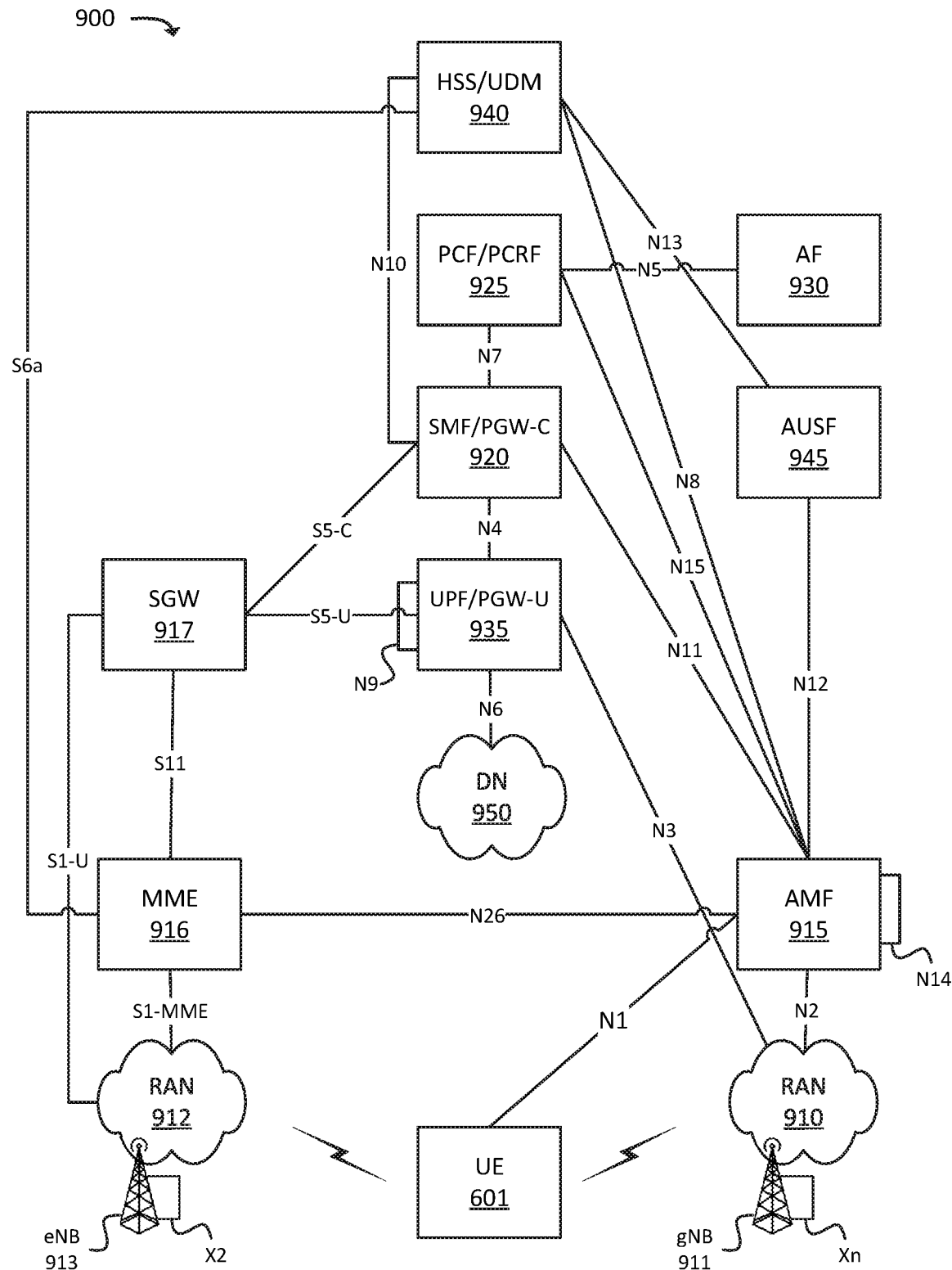
FIG. 9 illustrates an example environment in which one or more embodiments, described herein, may be implemented.

FIG. 9 illustrates an example environment 900, in which one or more embodiments may be implemented. In some embodiments, environment 900 may correspond to a Fifth Generation ("5G") network, and/or may include elements of a 5G network. In some embodiments, environment 900 may correspond to a 5G Non-Standalone ("NSA") architecture, in which a 5G radio access technology ("RAT") may be used in conjunction with one or more other RATs (e.g., a LTE RAT), and/or in which elements of a 5GC network may be implemented by, may be communicatively coupled with, and/or may include elements of another type of core network (e.g., an EPC). As shown, environment 900 may include UE 601, RAN 910 (which may include one or more Next Generation Node Bs ("gNBs") 911), RAN 912 (which may include one or more one or more evolved Node Bs ("eNBs") 913), and various network functions such as Access and Mobility Management Function ("AMF") 915, Mobility Management Entity ("MME") 916, Serving Gateway ("SGW") 917, SMF/Packet Data Network ("PDN") Gateway ("PGW")-Control plane function ("PGW-C") 920, Policy Control Function ("PCF")/Policy Charging and Rules Function ("PCRF") 925, Application Function ("AF") 930, User Plane Function ("UPF")/PGW-User plane function ("PGW-U") 935, Home Subscriber Server ("HSS")/Unified Data Management ("UDM") 940, and Authentication Server Function ("AUSF") 945. In some embodiments, UE 601 may be particular UE of a set of UEs 601. Further RANs 910 and/or 912 may include, implement, or be implemented by one or more of RANs 603. Environment 900 may also include one or more networks, such as Data Network ("DN") 950.

The example shown in FIG. 9 illustrates one example of each network component or function (e.g., one instance of SMF/PGW-C 920, PCF/PCRF 925, UPF/PGW-U 935, HSS/UDM 940, and/or 945. In practice, environment 900 may include multiple instances of such components or functions. For example, in some embodiments, environment 900 may include multiple "slices" of a core network, where each slice includes a discrete set of network functions (e.g., one slice may include a first instance of SMF/PGW-C 920, PCF/PCRF 925, UPF/PGW-U 935, HSS/UDM 940, and/or 945, while another slice may include a second instance of SMF/PGW-C 920, PCF/PCRF 925, UPF/PGW-U 935, HSS/UDM 940, and/or 945). The different slices may provide differentiated levels of service, such as service in accordance with different Quality of Service ("QoS") parameters.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. Alternatively, or additionally, one or more of the devices of environment 900 may perform one or more network functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

To the extent that particular ones of the devices, systems, elements, etc. of environment 900 receive, process, queue, and/or otherwise handle traffic, data, etc., such receiving, processing, etc. may be performed in a manner described above. For example, individual instances of such network elements may perform a pseudo-cooperative load balancing technique in a manner similar to that described above.

UE 601 may include a computation and communication device, such as a wireless mobile communication device that is capable of communicating with RAN 910, RAN 912, and/or DN 950. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 601 may send traffic to and/or receive traffic (e.g., user plane traffic) from DN 950 via RAN 910, RAN 912, and/or UPF/PGW-U 935.

RAN 910 may be, or may include, a 5G RAN that includes one or more base stations (e.g., one or more gNBs 911), via which UE 601 may communicate with one or more other elements of environment 900. UE 601 may communicate with RAN 910 via an air interface (e.g., as provided by gNB 911). For instance, RAN 910 may receive traffic (e.g., voice call traffic, data traffic, messaging traffic, signaling traffic, etc.) from UE 601 via the air interface, and may communicate the traffic to UPF/PGW-U 935, and/or one or more other devices or networks. Similarly, RAN 910 may receive traffic intended for UE 601 (e.g., from UPF/PGW-U 935, AMF 915, and/or one or more other devices or networks) and may communicate the traffic to UE 601 via the air interface.

RAN 912 may be, or may include, a LTE RAN that includes one or more base stations (e.g., one or more eNBs 913), via which UE 601 may communicate with one or more other elements of environment 900. UE 601 may communicate with RAN 912 via an air interface (e.g., as provided by eNB 913). For instance, RAN 910 may receive traffic (e.g., voice call traffic, data traffic, messaging traffic, signaling traffic, etc.) from UE 601 via the air interface, and may communicate the traffic to UPF/PGW-U 935, and/or one or more other devices or networks. Similarly, RAN 910 may receive traffic intended for UE 601 (e.g., from UPF/PGW-U 935, SGW 917, and/or one or more other devices or networks) and may communicate the traffic to UE 601 via the air interface.

AMF 915 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 910 and/or gNBs 911, and/or to perform other operations. In some embodiments, the 5G network may include multiple AMFs 915, which communicate with each other via the N14 interface (denoted in FIG. 9 by the line marked "N14" originating and terminating at AMF 915).

MME 916 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 912 and/or eNBs 913, and/or to perform other operations.

SGW 917 may include one or more devices, systems, VNFs, etc., that aggregate traffic received from one or more eNBs 913 and send the aggregated traffic to an external network or device via UPF/PGW-U 935. Additionally, SGW 917 may aggregate traffic received from one or more UPF/PGW-Us 935 and may send the aggregated traffic to one or more eNBs 913. SGW 917 may operate as an anchor for the user plane during inter-eNB handovers and as an anchor for mobility between different telecommunication networks or RANs (e.g., RANs 910 and 912).

SMF/PGW-C 920 may include one or more devices, systems, VNFs, etc., that gather, process, store, and/or provide information in a manner described herein. SMF/PGW-C 920 may, for example, facilitate in the establishment of communication sessions on behalf of UE 601. In some embodiments, the establishment of communications sessions may be performed in accordance with one or more policies provided by PCF/PCRF 925.

PCF/PCRF 925 may include one or more devices, systems, VNFs, etc., that aggregate information to and from the 5G network and/or other sources. PCF/PCRF 925 may receive information regarding policies and/or subscriptions from one or more sources, such as subscriber databases and/or from one or more users (such as, for example, an administrator associated with PCF/PCRF 925).

AF 930 may include one or more devices, systems, VNFs, etc., that receive, store, and/or provide information that may be used in determining parameters (e.g., quality of service parameters, charging parameters, or the like) for certain applications.

UPF/PGW-U 935 may include one or more devices, systems, VNFs, etc., that receive, store, and/or provide data (e.g., user plane data). For example, UPF/PGW-U 935 may receive user plane data (e.g., voice call traffic, data traffic, etc.), destined for UE 601, from DN 950, and may forward the user plane data toward UE 601 (e.g., via RAN 910, SMF/PGW-C 920, and/or one or more other devices). In some embodiments, multiple UPFs 935 may be deployed (e.g., in different geographical locations), and the delivery of content to UE 601 may be coordinated via the N9 interface (e.g., as denoted in FIG. 9 by the line marked "N9" originating and terminating at UPF/PGW-U 935). Similarly, UPF/PGW-U 935 may receive traffic from UE 601 (e.g., via RAN 910, SMF/PGW-C 920, and/or one or more other devices), and may forward the traffic toward DN 950. In some embodiments, UPF/PGW-U 935 may communicate (e.g., via the N4 interface) with SMF/PGW-C 920, regarding user plane data processed by UPF/PGW-U 935.

HSS/UDM 940 and AUSF 945 may include one or more devices, systems, VNFs, etc., that manage, update, and/or store, in one or more memory devices associated with AUSF 945 and/or HSS/UDM 940, profile information associated with a subscriber. AUSF 945 and/or HSS/UDM 940 may perform authentication, authorization, and/or accounting operations associated with the subscriber and/or a communication session with UE 601.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 601 may communicate, through DN 950, with data servers, other UEs 601, and/or to other servers or applications that are coupled to DN 950. DN 950 may be connected to one or more other networks, such as a public switched telephone network ("PSTN"), a public land mobile network ("PLMN"), and/or another network. DN 950 may be connected to one or more devices, such as content providers, applications, web servers, and/or other devices, with which UE 601 may communicate.

Figure 10:
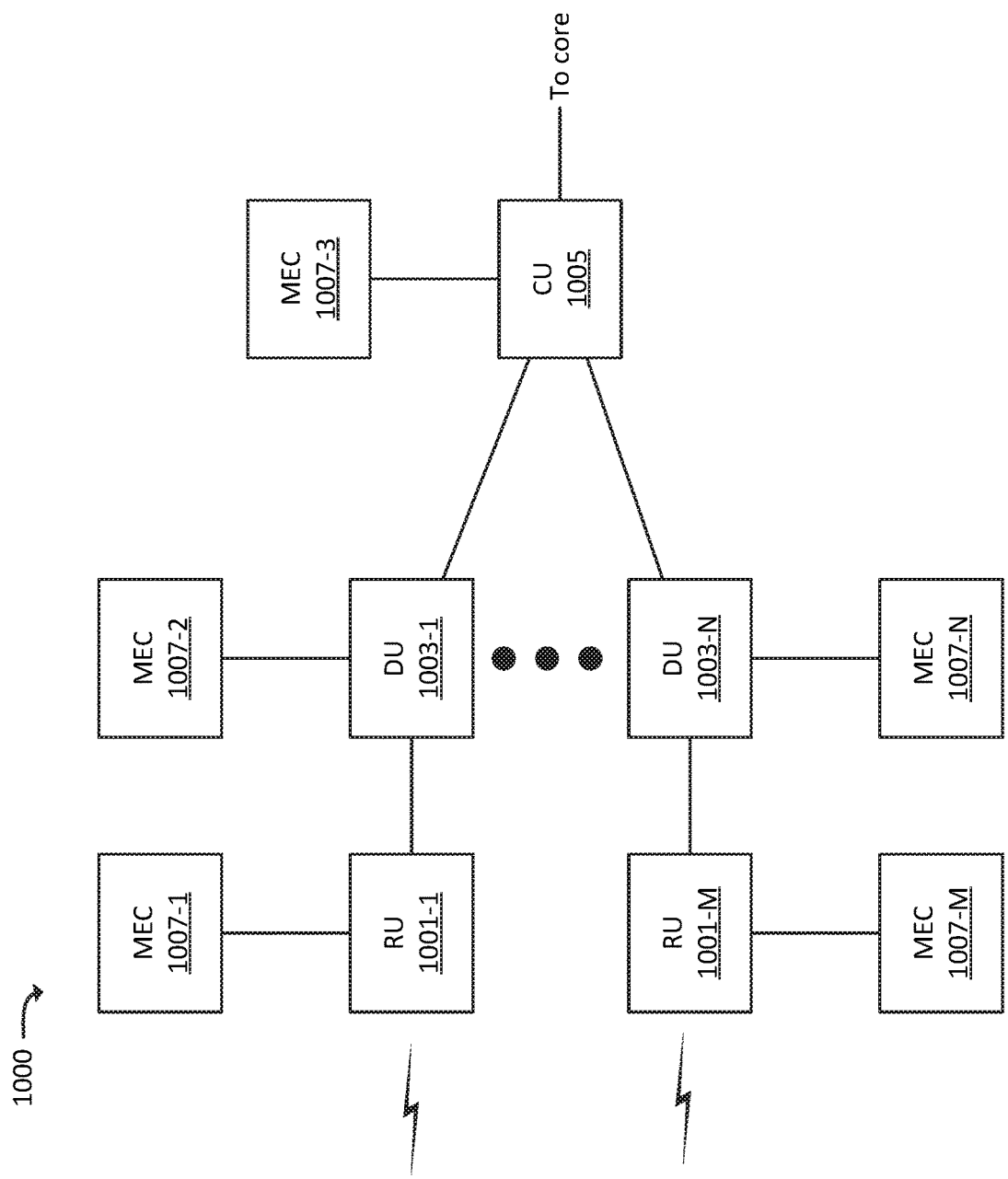
FIG. 10 illustrates an example arrangement of a radio access network ("RAN"), in accordance with some embodiments.

FIG. 10 illustrates an example Distributed Unit ("DU") network 1000, which may be included in and/or implemented by one or more RANs (e.g., RAN 910). In some embodiments, a particular RAN may include one DU network 1000. In some embodiments, a particular RAN may include multiple DU networks 1000. In some embodiments, DU network 1000 may correspond to a particular gNB 911 of a 5G RAN (e.g., RAN 910). In some embodiments, DU network 1000 may correspond to multiple gNBs 911. In some embodiments, DU network 1000 may correspond to one or more other types of base stations of one or more other types of RANs. As shown, DU network 1000 may include Central Unit ("CU") 1005, one or more Distributed Units ("DUs") 1003-1 through 1003-N (referred to individually as "DU 1003," or collectively as "DUs 1003"), and one or more Radio Units ("RUs") 1001-1 through 1001-M (referred to individually as "RU 1001," or collectively as "RUs 1001").

CU 1005 may communicate with a core of a wireless network (e.g., may communicate with one or more of the devices or systems described above with respect to FIG. 9, such as AMF 915 and/or UPF/PGW-U 935). In the uplink direction (e.g., for traffic from UEs 601 to a core network), CU 1005 may aggregate traffic from DUs 1003, and forward the aggregated traffic to the core network. In some embodiments, CU 1005 may receive traffic according to a given protocol (e.g., Radio Link Control ("RLC")) from DUs 1003, and may perform higher-layer processing (e.g., may aggregate/process RLC packets and generate Packet Data Convergence Protocol ("PDCP") packets based on the RLC packets) on the traffic received from DUs 1003.

In accordance with some embodiments, CU 1005 may receive downlink traffic (e.g., traffic from the core network) for a particular UE 601, and may determine which DU(s) 1003 should receive the downlink traffic. DU 1003 may include one or more devices that transmit traffic between a core network (e.g., via CU 1005) and UE 601 (e.g., via a respective RU 1001). DU 1003 may, for example, receive traffic from RU 1001 at a first layer (e.g., physical ("PHY") layer traffic, or lower PHY layer traffic), and may process/aggregate the traffic to a second layer (e.g., upper PHY and/or RLC). DU 1003 may receive traffic from CU 1005 at the second layer, may process the traffic to the first layer, and provide the processed traffic to a respective RU 1001 for transmission to UE 601.

RU 1001 may include hardware circuitry (e.g., one or more RF transceivers, antennas, radios, and/or other suitable hardware) to communicate wirelessly (e.g., via an RF interface) with one or more UEs 601, one or more other DUs 1003 (e.g., via RUs 1001 associated with DUs 1003), and/or any other suitable type of device. In the uplink direction, RU 1001 may receive traffic from UE 601 and/or another DU 1003 via the RF interface and may provide the traffic to DU 1003. In the downlink direction, RU 1001 may receive traffic from DU 1003, and may provide the traffic to UE 601 and/or another DU 1003.

RUs 1001 may, in some embodiments, be communicatively coupled to one or more Multi-Access/Mobile Edge Computing ("MEC") devices, referred to sometimes herein simply as ("MECs") 1007. For example, RU 1001-1 may be communicatively coupled to MEC 1007-1, RU 1001-M may be communicatively coupled to MEC 1007-M, DU 1003-1 may be communicatively coupled to MEC 1007-2, DU 1003-N may be communicatively coupled to MEC 1007-N, CU 1005 may be communicatively coupled to MEC 1007-3, and so on. MECs 1007 may include hardware resources (e.g., configurable or provisionable hardware resources) that may be configured to provide services and/or otherwise process traffic to and/or from UE 601, via a respective RU 1001.

For example, RU 1001-1 may route some traffic, from UE 1001, to MEC 1007-1 instead of to a core network (e.g., via DU 1003 and CU 1005). MEC 1007-1 may process the traffic, perform one or more computations based on the received traffic, and may provide traffic to UE 601 via RU 1001-1. In this manner, ultra-low latency services may be provided to UE 601, as traffic does not need to traverse DU 1003, CU 1005, and an intervening backhaul network between DU network 1000 and the core network. In some embodiments, one or more RUs 1001, DUs 1003, CUs 1005, and/or MECs 1007 may perform the pseudo-cooperative load balancing techniques described above in accordance with some embodiments.

Figure 11:
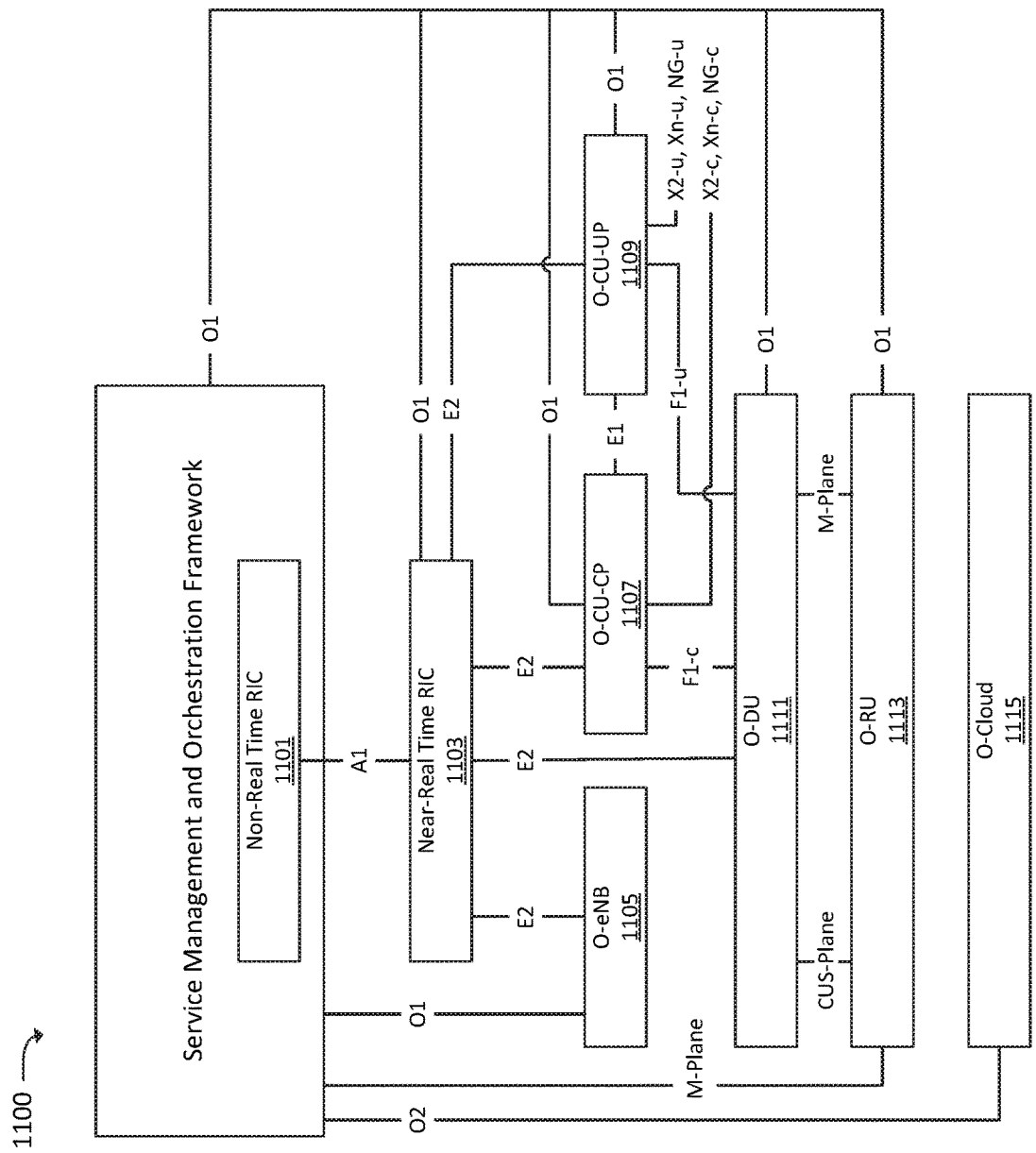
FIG. 11 illustrates an example arrangement of an Open RAN ("O-RAN") environment in which one or more embodiments, described herein, may be implemented.

FIG. 11 illustrates an example O-RAN environment 1100, which may correspond to RAN 911, RAN 912, and/or DU network 1000. For example, RAN 911, RAN 912, and/or DU network 1000 may include one or more instances of O-RAN environment 1100, and/or one or more instances of O-RAN environment 1100 may implement RAN 911, RAN 912, DU network 1000, and/or some portion thereof. As shown, O-RAN environment 1100 may include Non-Real Time Radio Intelligent Controller ("RIC") 1101, Near-Real Time RIC 1103, O-eNB 1105, O-CU-Control Plane ("O-CU-CP") 1107, O-CU-User Plane ("O-CU-UP") 1109, O-DU 1111, O-RU 1113, and O-Cloud 1115. In some embodiments, O-RAN environment 1100 may include additional, fewer, different, and/or differently arranged components.

In some embodiments, some or all of the elements of O-RAN environment 1100 may be implemented by one or more configurable or provisionable resources, such as virtual machines, cloud computing systems, physical servers, and/or other types of configurable or provisionable resources. In some embodiments, some or all of O-RAN environment 1100 may be implemented by, and/or communicatively coupled to, one or more MECs 1007. In some embodiments, one or more of the elements of O-RAN environment 1100 may perform the pseudo-cooperative load balancing techniques described above in accordance with some embodiments.

Non-Real Time RIC 1101 and Near-Real Time RIC 1103 may receive performance information (and/or other types of information) from one or more sources, and may configure other elements of O-RAN environment 1100 based on such performance or other information. For example, Near-Real Time RIC 1103 may receive performance information, via one or more E2 interfaces, from O-eNB 1105, O-CU-CP 1107, and/or O-CU-UP 1109, and may modify parameters associated with O-eNB 1105, O-CU-CP 1107, and/or O-CU-UP 1109 based on such performance information. Similarly, Non-Real Time RIC 1101 may receive performance information associated with O-eNB 1105, O-CU-CP 1107, O-CU-UP 1109, and/or one or more other elements of O-RAN environment 1100 and may utilize machine learning and/or other higher level computing or processing to determine modifications to the configuration of O-eNB 1105, O-CU-CP 1107, O-CU-UP 1109, and/or other elements of O-RAN environment 1100. In some embodiments, Non-Real Time RIC 1101 may generate machine learning models based on performance information associated with O-RAN environment 1100 or other sources, and may provide such models to Near-Real Time RIC 1103 for implementation.

O-eNB 1105 may perform functions similar to those described above with respect to eNB 913. For example, O-eNB 1105 may facilitate wireless communications between UE 601 and a core network. O-CU-CP 1107 may perform control plane signaling to coordinate the aggregation and/or distribution of traffic via one or more DUs 1003, which may include and/or be implemented by one or more O-DUs 1111, and O-CU-UP 1109 may perform the aggregation and/or distribution of traffic via such DUs 903 (e.g., O-DUs 1111). O-DU 1111 may be communicatively coupled to one or more RUs 601, which may include and/or may be implemented by one or more O-RUs 1113. In some embodiments, O-Cloud 1115 may include or be implemented by one or more MECs 907, which may provide services, and may be communicatively coupled, to O-CU-CP 1107, O-CU-UP 1109, O-DU 1111, and/or O-RU 1113 (e.g., via an O1 and/or O2 interface).

Figure 12:
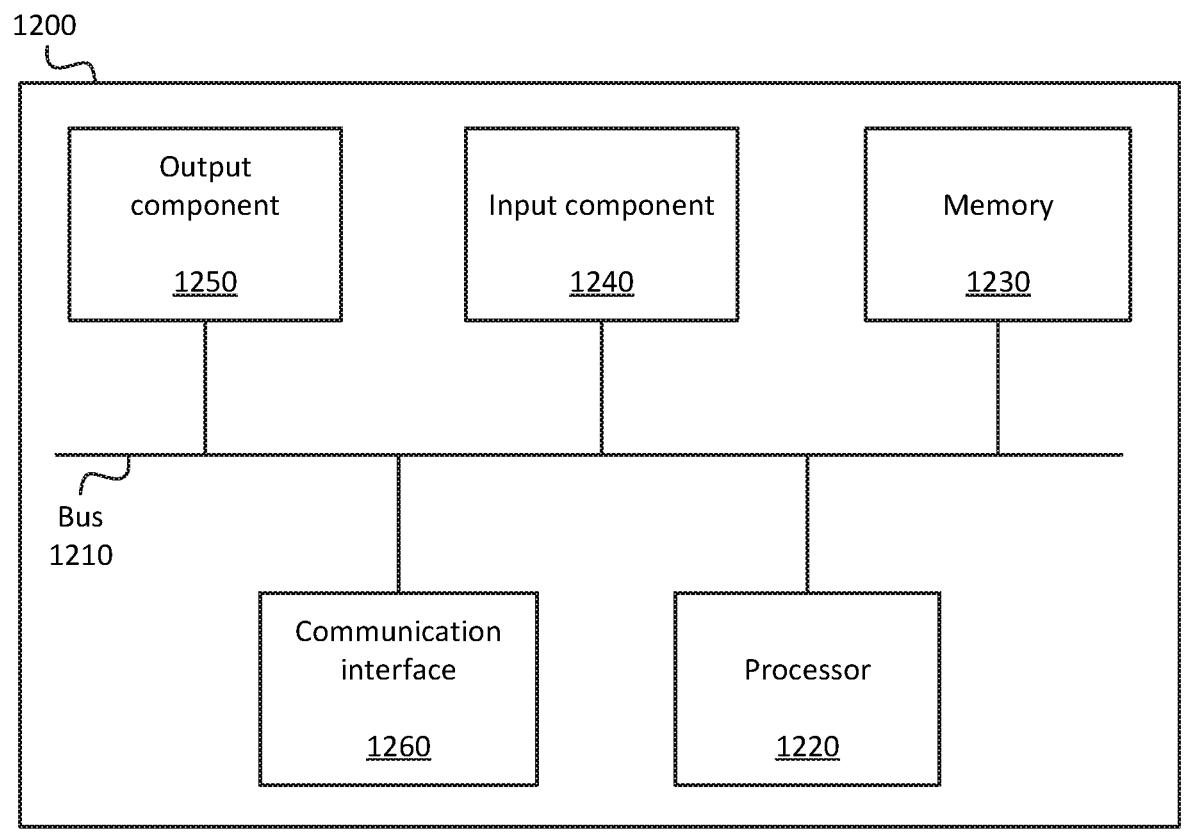
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive a plurality of data items that are each associated with a respective identifier;
monitor a quantity of data items, of the plurality of data items, associated with each respective identifier over a particular period of time;
determine, based on the monitoring, that a first quantity, of a first set of data items associated with a first identifier, does not exceed a threshold quantity;
determine, based on the monitoring, that a second quantity, of a second set of data items associated with a second identifier, exceeds the threshold quantity;
generate a first output key corresponding to the first set of data items;
generate a plurality of output keys corresponding to the second set of data items, the plurality of output keys including at least a second output key and a third output key, the plurality of output keys being generated based on determining that the second quantity exceeds the threshold quantity;
determine or receive information indicating a plurality of respective destinations for the first and second sets of data, the respective destinations being determined based on the first, second, and third output keys;
output the first set of data items to a first destination of the plurality of destinations, the first destination having been determined based on the first output key;
output a first portion of the second set of data items to a second destination of the plurality of destinations, the second destination having been determined based on the second output key; and
output a second portion of the second set of data items to a third destination of the plurality of destinations, the third destination having been determined based on the third output key.

2. The device of claim 1,
wherein generating the first output key includes performing a first set of functions on the first identifier,
wherein generating the second output key includes performing a second set of functions on the second identifier, and
wherein generating the third output key includes performing a third set of functions on the second identifier, wherein the second and third sets of functions are different sets of functions.

3. The device of claim 2, wherein the first set of functions is a different set of functions from at least one of the second set of functions or the third set of functions.

4. The device of claim 2, wherein at least one of the first, second, or third functions include one or more hashing functions.

5. The device of claim 1,
wherein generating the first output key includes performing a particular set of functions on the first identifier,
wherein generating the second output key includes performing the same particular set of functions on a first modified version of the second identifier, and
wherein generating the third output key includes performing the same particular set of functions on a second modified version of the second identifier.

6. The device of claim 5, wherein the first and second modified versions of the second identifier are different randomized versions of the second identifier.

7. The device of claim 1, wherein the identifiers include an identifier of a particular User Equipment ("UE") out of a plurality of UEs, and wherein the plurality of data items include a plurality of packets corresponding to user plane traffic associated with respective UEs of the plurality of UEs.

8. A non-transitory computer-readable medium, storing a plurality of processor-executable instructions to:
receive a plurality of data items that are each associated with a respective identifier;
monitor a quantity of data items, of the plurality of data items, associated with each respective identifier over a particular period of time;
determine, based on the monitoring, that a first quantity, of a first set of data items associated with a first identifier, does not exceed a threshold quantity;
determine, based on the monitoring, that a second quantity, of a second set of data items associated with a second identifier, exceeds the threshold quantity;
generate a first output key corresponding to the first set of data items;
generate a plurality of output keys corresponding to the second set of data items, the plurality of output keys including at least a second output key and a third output key, the plurality of output keys being generated based on determining that the second quantity exceeds the threshold quantity;
determine or receive information indicating a plurality of respective destinations for the first and second sets of data, the respective destinations being determined based on the first, second, and third output keys;
output the first set of data items to a first destination of the plurality of destinations, the first destination having been determined based on the first output key;
output a first portion of the second set of data items to a second destination of the plurality of destinations, the second destination having been determined based on the second output key; and
output a second portion of the second set of data items to a third destination of the plurality of destinations, the third destination having been determined based on the third output key.

9. The non-transitory computer-readable medium of claim 8,
wherein generating the first output key includes performing a first set of functions on the first identifier,
wherein generating the second output key includes performing a second set of functions on the second identifier, and wherein generating the third output key includes performing a third set of functions on the second identifier, wherein the second and third sets of functions are different sets of functions.

10. The non-transitory computer-readable medium of claim 9, wherein the first set of functions is a different set of functions from at least one of the second set of functions or the third set of functions.

11. The non-transitory computer-readable medium of claim 9, wherein at least one of the first, second, or third functions include one or more hashing functions.

12. The non-transitory computer-readable medium of claim 8,
wherein generating the first output key includes performing a particular set of functions on the first identifier,
wherein generating the second output key includes performing the same particular set of functions on a first modified version of the second identifier, and
wherein generating the third output key includes performing the same particular set of functions on a second modified version of the second identifier.

13. The non-transitory computer-readable medium of claim 12, wherein the first and second modified versions of the second identifier are different randomized versions of the second identifier.

14. The non-transitory computer-readable medium of claim 8, wherein the identifiers include an identifier of a particular User Equipment ("UE") out of a plurality of UEs, and wherein the plurality of data items include a plurality of packets corresponding to user plane traffic associated with respective UEs of the plurality of UEs.

15. A method, comprising:
receiving a plurality of data items that are each associated with a respective identifier;
monitoring a quantity of data items, of the plurality of data items, associated with each respective identifier over a particular period of time;
determining, based on the monitoring, that a first quantity, of a first set of data items associated with a first identifier, does not exceed a threshold quantity;
determining, based on the monitoring, that a second quantity, of a second set of data items associated with a second identifier, exceeds the threshold quantity;
generating a first output key corresponding to the first set of data items;
generating a plurality of output keys corresponding to the second set of data items, the plurality of output keys including at least a second output key and a third output key, the plurality of output keys being generated based on determining that the second quantity exceeds the threshold quantity;
determining or receive information indicating a plurality of respective destinations for the first and second sets of data, the respective destinations being determined based on the first, second, and third output keys;
outputting the first set of data items to a first destination of the plurality of destinations, the first destination having been determined based on the first output key;
outputting a first portion of the second set of data items to a second destination of the plurality of destinations, the second destination having been determined based on the second output key; and
outputting a second portion of the second set of data items to a third destination of the plurality of destinations, the third destination having been determined based on the third output key.

16. The method of claim 15,
wherein generating the first output key includes performing a first set of functions on the first identifier,
wherein generating the second output key includes performing a second set of functions on the second identifier, and
wherein generating the third output key includes performing a third set of functions on the second identifier, wherein the second and third sets of functions are different sets of functions.

17. The method of claim 16, wherein the first set of functions is a different set of functions from at least one of the second set of functions or the third set of functions.

18. The method of claim 16, wherein at least one of the first, second, or third functions include one or more hashing functions.

19. The method of claim 15,
wherein generating the first output key includes performing a particular set of functions on the first identifier,
wherein generating the second output key includes performing the same particular set of functions on a first modified version of the second identifier, and
wherein generating the third output key includes performing the same particular set of functions on a second modified version of the second identifier, wherein the first and second modified versions of the second identifier are different randomized versions of the second identifier.

20. The method of claim 15, wherein the identifiers include an identifier of a particular User Equipment ("UE") out of a plurality of UEs, and wherein the plurality of data items include a plurality of packets corresponding to user plane traffic associated with respective UEs of the plurality of UEs.

* * * * *